June 3, 1969  J. VERHOEFF  3,448,254
DATA CHECKING SYSTEM
Filed July 28, 1965  Sheet 1 of 11

LAST (CHECK)
DIGIT: 9

FIRST DIGIT: 3

SECOND DIGIT: 9

THIRD DIGIT: 0
(=10 PULSES)

FOURTH DIGIT: 5

FIG.15

United States Patent Office 3,448,254
Patented June 3, 1969

3,448,254
DATA CHECKING SYSTEM
Jacobus Verhoeff, The Hague, Netherlands, assignor to Anker-Werke Aktiengesellschaft, Bielefeld, Germany, a German corporation
Filed July 28, 1965, Ser. No. 475,417
Int. Cl. G06f 11/00
U.S. Cl. 235—153
14 Claims

ABSTRACT OF THE DISCLOSURE

Apparatus for checking a digital group of the characters selected from a total of $4m+2$ different characters comprises a modulo-2 circuit for determining the relation $c/d$ wherein $c$ is the modulo-2 sum of the number of entered digit positions independent of the value of the digit positions and $d$ is indicative of the modulo-2 sum of the number of entered digit positions whose number value is at least $2m+2$. A modulo-$(2m+2)$ alegbraic adding circuit responds to all digit values of the entered characters. The modulo-2 logic circuit is in controlling connection with the adding circuit for controlling its algebraic sense in dependence upon a given condition of the $c/d$ relation whereby when a character group is entered, the result of the algebraic addition and the $c/d$ relation then reached are conjointly indicative of a singular check symbol from among the $4m+2$ characters. The check symbol, when digitally added to the entered group, causes the result of the algebraic addition and the $c/d$ relation to be in accordance with a predetermined checking condition.

---

My invention relates to methods and means for detecting information errors in data processing equipment. More specifically, the invention relates to methods and means for checking a group or digital sequence of characters individualy selected from a total of $4m+2$ different characters having respective fixed values, wherein $m$ is at least equal to the value 2, and wherein to each such group of characters there is added a check symbol selected from the same number of $4m+2$ available characters. Upon introduction of the character group with its check symbol, the resulting response of the checking device is indicative of the accuracy or inaccuracy of the group.

For illustration of the term $4m+2$, it will be seen that in a decimal number, the value of $m$ is equal to 2, so that $4m+2=10$, corresponding to the ten values 0 . . . 9 available for each individual digit position. For an alphabetic group with a total of 26 different characters, the value of $m$ would be $m=6$.

A checking device, intended exclusively for $m=2$ and consequently for checking a decimal number, is known from the German Patent 1,025,180. The device is supplied with a character group to which a check symbol is added. If the group of characters is correct, the device reaches a given ultimate state. If an error was made when entering a group of characters, for example by mutually exchanging two sequential characters, this ultimate state of the device does not come about. Difficulties are encountered in two cases, namely for $m=2$ (decimal numbers) and for $m=6$ (alphabetic groups).

Thus, in a self-checking device according to Netherlands Patent 100,613 or U.S. Patent 3,138,701 for use with decimal numbers ($m=2$), an eleventh digit symbol is used as a check symbol. While the checking performance of such a device is satisfactory, it has the serious shortcoming of requiring an additional symbol since no eleventh digit symbol is available in the decimal system.

For character groups exclusively consisting of alphabetic letters so that $m=6$, no satisfactory checking method is known if use is made only of the letters available in the alphabet.

There is also a device for $m=2$ according to German Patent 1,025,180 which does not need an additional symbol, but in this case the checking performance leaves much to be desired. For example, when a number is being entered into such a device, equipped with two counters, different digit numerals may result in one and the same sum of the numerals determined by the respective final states of the counters. For example, when the numerals 4 and 8 are entered into the counters having respective base values 3 and 5, and the sum results in the checking numeral, no distinction can be made between the number 81 $\underline{4}$19 and the number 81 $\underline{8}$19.

Nor is the checking satisfactory with the method of the International Business Machines Corporation (see the Preliminary Manual for Self-Checking Number Device for Types 24–26 Card Punches, form 22–6022–0; pages 4–5) for $m=2$, because a confusion between sequential numerals 0 and 9 cannot be ascertained by this method. Roger L. Sisson, in his paper "An Improved Decimal Redundancy Check" published in Communications of the Association for Computing Machinery, Volume 1 (1958), No. 5, page 10, has stated that a checking system with ten characters, which ascertains all possible confusions of two sequential numerals does not exist.

It is an object of my invention to devise a method and means for checking a character group whose characters are selected from a $(4m+2)$-number of different characters, and which affords a complete checking for errors such as the faulty entering of a character or a confusion between two sequential characters, without the necessity of adding a checking symbol extraneous to the digital system being used. Another object of my invention, additional to the one mentioned above, is to devise a self-checking system that affords a multiple choice of checking conditions, such as an initially free choice of up to ten such different conditions for a decimal system, thus permitting, for example, the use of a selected one matrix of single-digit check numbers at one locality (for instance one of the branches of a bank or business) and a selected different check-number matrix at another locality, with the effect that a multi-digit number (such as a customer account number) which is correct at one locality will be checked as incorrect at the other locality.

Still another object of the invention is to devise a self-checking system, which aside from meeting the above-stated objects, also affords a subsequent increase in the number of digit positions without rendering the originally adopted checking symbols obsolete, this being of value, for example, if changes in business require changing from 10-position to 12-position keyboards in the accounting machines or other business equipment being used, thus requiring that zeroes ("0") be added in front of pre-existing account numbers without affecting the check digits of those numbers.

To achieve these objects, and in accordance with my invention, I derive by preferably electrical logic means two binary (modulo-2) components ($c$ and $d$) from a mechanically or electrically entered digital group formed of up to $4m+2$ different characters, $m$ being an integer, and algebraically add in modulus $2m+2$, also by logic means, the digit values of the entire group while controlling the ($+$ or $-$) sense of the algebraic addition in dependence upon the ($c/d$) relation of the two binary components, whereupon the result of the algebraic addition in conjunction with the ultimate condition of one or both of the modulo-2 components are indicative of the check symbol to be added as a digit to the group, or—if the group already contains the check digit—are indicative of whether or not the entered group is correct. One of the binary components just mentioned corresponds to a modulo-2 count of the digit positions of the character group being entered, or may be looked upon as simply showing by its "1" or "0" state whether the number of digit positions is odd or even. The other modulo-2 component essentially corresponds to a modulo-2 count of those digit positions whose value is above $2m+2$.

As will appear from the mathematical explanations given below, my invention may also be looked upon as providing a logic method and system for modulo-2 addition to binary components of the values represented by the respective characters, and for modulo-$(2m+1)$ algebraic addition of the differences between the successive pairs of $(2m+1)$-ary components of these values, the base $m$ being any desired integer, and the ($+$ or $-$) sign preceding the difference between the $(2j)$-th and the $(2j+1)$-th of the $(2m+1)$-ary components being determined by $-1$ in the exponent equal to the sum of the binary components of the first $2j$ symbols, and by a function of the binary components which respectively does not, or does, change the result of the modulo-$(2m+1)$ addition when an exchange occurs between two successive symbols having the same or different binary components respectively ($j=1, 2 \ldots n$).

According to a more specific feature of the invention, the above-mentioned function of the binary components may be formed by the algebraic sum of the double binary components of the value assigned to each $(2j)$-th symbol and may be provided with a ($+$ or $-$) sign opposed to one preceding the difference between the $(2j)$-th and the $(2j+1)$-th of the $(2m+1)$-ary components.

In the embodiments of my invention described herein, the base value of $m$ is 2 for a character group constituting a decimal number, and the symbols 1 . . . 9 have the corresponding numerical values, whereas the symbol 0 denotes the value 10. However, the numerical values assigned to the symbols 1 . . . 9, 0 may also differ from the respective values usually ascribed thereto, as will be explained hereinafter.

According to other more specific features of my invention, here initially briefly described with parenthetical reference to FIG. 1 of the drawing, but more fully explained in a later place, an apparatus for checking entered or transmitted data receives the characters of the group as well as the check symbol in form of sequential pulses in a number which determine the value of each character; and these pulses are passed through three different paths, namely first to a pulse-detecting timer member or discriminator G1 which responds to the presence of such a pulse sequence and passes it to first cyclical counter C1, such as a binary ring counter. Secondly, the pulses are supplied to a limit counter B1 which occupies its final counting state upon receiving six or more pulses. Thirdly, the pulses are also applied to a modulo-5 ring counter A1. The output voltage pulses from the cyclical counter C1 and the limit counter B1 together with those from the discriminator G1 act through a coincidence gate circuit E1 to control the input of a second cyclical binary counter D1 for modulo-2 addition of binary components of the digit numerals to the number (character group) to be checked. The second modulo-2 ring counter has its output connected to the above-mentioned cyclical counter A1 in modulus 5 to perform an algebraic addition, relative to which the ($+$ or $-$) sign is determined by the result of the modulo-2 addition of the respective counting stages to which the two binary ring counters C1, D1 have been set.

The supply of a group of characters and of the check symbol in form of successive pulse sequences is known from Netherlands Patent 86,715 showing an apparatus on the elevens-type checking principle, which requires providing a special symbol for the tenth check symbol. This check symbol is constituted by an idle signal, so that the corresponding pulse sequence counts 0 pulses. The use of such a device for checking telephone numbers, for example, has the result that the numbers are unequal in length which entails a variety of difficulties.

It is further known from Netherlands Patent 101,294 to indicate the sign of an addition by the state of a bistable flip-flop network.

According to another alternative feature of my invention, the numerals or other characters of the group and the check symbol are entered in parallel relation, namely in form of a pulse through respective lines assigned to the different numerical values (FIG. 2), and these pulses are passed through four different paths, namely to a first cyclical counter C2 in modulus 2, then to a second cyclical counter D2 in modulus 2 for modulo-2 addition of the binary components of the numerals in the number (character group) to be checked. The pulse sequences are further supplied through the respective lines to corresponding inputs of a code converter H2 which has further inputs connected with the outputs of the counters C2 and D2, the code converter having four outputs connected with the inputs of a cyclical quinary counter A2 for modulo-5 algebraic addition, in order to determine the number of the counter stages. If the number, including the check symbol, is correct, the last occurring pulse through a lead common to counters will set them to the prescribed set of checking conditions; but if the number is incorrect this state will not be reached.

It may be mentioned that a device operating with parallel entering of numbers and of a checking symbol is known as such from Netherlands Patent 105,499; but this device requires entering more than ten different check symbols with the aid of special keys.

Also known is the skipping of counter stages in a counting device composed of a number of stages connected in cascade and having two stable states. When a pulse is entered, the state of each stage is changed and when a given stage is reached, a pulse is issued to the next following stage. Note the Netherlands Patent 101,294.

My invention will be further explained with reference to the accompanying drawing illustrating embodiments of self-checking systems according to the invention by way of example, and with reference to accompanying tables.

FIG. 15 is a pulse diagram relating to the embodiment of FIGS. 12 to 14.

Figure 1:
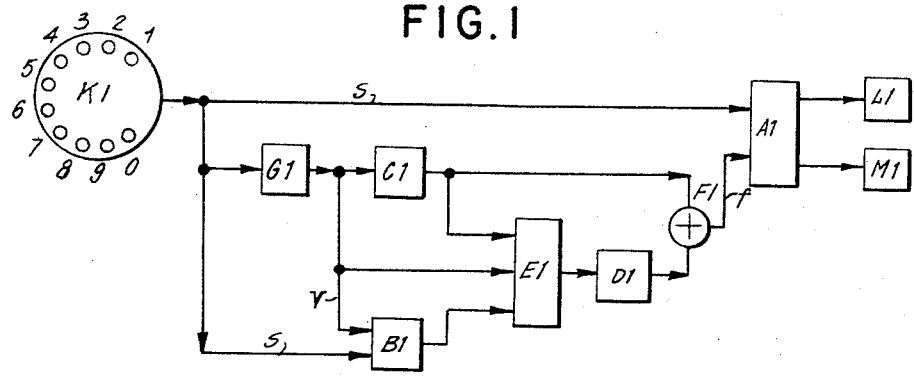
FIG. 1 is a logic diagram of a first embodiment of the checking system of the present invention for sequential entry of decimal digits.

With reference to all of the illustrated embodiments, it appears helpful to first describe how suitable rules are set up for reliably checking a decimal number, for which $m=2$. The general case of checking a character group in which the characters are chosen from any other $(4m+2)$-number is then readily derivable by substituting the $(2m+1)$-ary component for the quinary component of the value assigned to a numeral.

For determining the check symbol of a digital number in such a way that an error affecting a digit position of the number, or a confusion of respective numerals in two successive digit positions, will always result in a different check symbol so that the error is ascertainable by the checking performance, the numerals that make up the digital number are to be represented in one or another biquinary manner. Assume that the numeral in the $i$-th digit position of a number $a_i$ has a binary component $\epsilon_i$ and a quinary component $\alpha_i$. If care is taken that the numerals 0 and 1 have respective different binary components, then it is also reliably possible—as will be shown further below— to additionally ascertain any error of the type $1x$ in lieu of $x0$, and hence for example, a confusion of thirteen for thirty, and vice versa. An example of a tabulation thus obtainable is shown in Table No. 1

TABLE 1

| $\alpha$ | $\epsilon$ | | | | |
|---|---|---|---|---|---|
| | 1 | 2 | 3 | 4 | 0 |
| 0 | 1 | 2 | 3 | 4 | 5 |
| 1 | 6 | 7 | 8 | 9 | 0 |

This tabulation may serve as a basis for the biquinary conversion of the digit numerals.

The checking performance is based upon two arithmetic formulas in which the permissible numbers with $n$ digits and a checking digit (the first digit having the rank numeral 0) must satisfy the conditions:

$$\sum_{i=0}^{n} \epsilon_i \equiv 0 (\mathrm{mod}\ 2) \qquad \text{(Equation 1)}$$

$$(-1)^{\epsilon_0}(\alpha_0 - \alpha_1 - 2\epsilon_0) + (-1)^{\epsilon_0+\epsilon_1+\epsilon_2}(\alpha_2 - \alpha_3 - 2\epsilon_2) + (-1)^{\epsilon_0+\epsilon_1+\epsilon_2+\epsilon_3+\epsilon_4}(\alpha_4 - \alpha_5 - 2\epsilon_4) + \ldots \equiv 0 (\mathrm{mod}\ 5) \text{(Equation 2a)}$$

or if one sets $$\sum_{i=0}^{j} \epsilon_i = \sigma_j (\mathrm{mod}\ 2)$$

then:

$$\sum_{j=0}^{[\frac{n}{2}]} (-1)^{\sigma_{2j}}(\alpha_{2j} - \alpha_{2j+1} - 2\epsilon_{2j}) \equiv 0 (\mathrm{mod}\ 5)$$

(Equation 2b)

If n is odd, then 0 is to be set for $\alpha_{n+1}$. In other words the summing operation is stopped when the available variety of numerals is consumed. It will be noted that the second equation comprises a quinary portion in which the coefficients still depend upon the binary components, and also comprises a binary correcting term. Relative to the latter there still remains some liberty of choice, as will more clearly appear from the following. Hence this corrective term may be chosen in accordance with the requirements of a particular embodiment or purpose.

The illustrated embodiments of equipment are based upon the above-presented equations.

The Equations 1 and 2 determine the check digit if the $n$ digits of the number have been freely chosen. This is because the Equation 1 determines the binary portion of the check symbol, whereas the Equation 2 determines the quinary portion.

The following applies to the detection of an error:

(1) An error in any individual digit position is always discovered. This is due to the following. If the error changes the binary portion, then the Equation 1 no longer applies. If the binary portion is not changed, then only the particular $\alpha$ in Equation 2 is changed. The coefficients and the binary portion, being independent of the $\alpha$'s, do not change, so that the Equation 2 is no longer satisfied.

(2) A confusion between two successive digits $\alpha_i$ and $\alpha_{i+1}$ is likewise always discovered. Equation 1 is not affected by such confusion, but Equation 2 changes. To investigate this, we distinguish between two possibilities in which $i$ is even and in which $i$ is odd.

Case $a$: $i$ is even, hence $i=2j$

The difference between the value of the left term in Equation 2 prior to and after the confusion is then $$(-1)^{\sigma_{2j}+\epsilon_{2j+1}-\epsilon_{2j}}(\alpha_{2j+1}-\alpha_{2j}-2\epsilon_{2j+1}) - (-1)^{\sigma_{2j}}(\alpha_{2j}-\alpha_{2j+1}-2\epsilon_{2j}) = (-1)^{\sigma_{2j}}[(\alpha_{2j}-\alpha_{2j+1})\{-1 - (-1)^{\epsilon_{2j+1}-\epsilon_{2j}}\} - 2\{-\epsilon_{2j}+(-1)^{\epsilon_{2j+1}-\epsilon_{2j}}\epsilon_{2j+1}\}]$$

This expression consists of two terms. The first one is 0 since $$\epsilon_{2j} \neq \epsilon_{2j+1}$$

but the second is then equal to:

$$+(-1)^{\sigma_{2j}} \cdot 2(\epsilon_{2j}+\epsilon_{2j+1}) = +2(-1^{\sigma_{2j}}) \neq 0\ (\mathrm{mod}\ 5)$$

However, if $\epsilon_{2j}=\epsilon_{2j+1}$, then the second term is 0, but the first term is then:

$$-(-1)^{\sigma_{2j}} \cdot 2(\alpha_{2j}-\alpha_{2j+1}) \neq 0\ (\mathrm{mod}\ 5)$$

since with $\epsilon_{2j}=\epsilon_{2j+1}$ there must be $\alpha_{2j} \neq \alpha_{2+1}$ for $a_i \neq a_{i+1}$.

Case $b$: $i$ is odd, hence $i=2j-1$.

Under these conditions the difference between the value of the left term in Equation 2b before and after the confusion is as follows:

$$(-1)^{\sigma_{2j-2}}(-\alpha_{2j}) + (-1)^{\sigma_{2j}}(\alpha_{2j-1}-2\epsilon_{2j-1}) - [(-1)^{\sigma_{2j-2}}(-\alpha_{2j-1}) + (-1)^{\sigma_{2j}}(\alpha_{2j}-2\epsilon_{2j})]$$
$$= (-1)^{\sigma_{2j-2}}[(\alpha_{2j}-\alpha_{2j-1})\{-1-(-1)^{\epsilon_{2j-1}+\epsilon_{2j}}\}-2\epsilon_{2j-1}-\epsilon_{2j})(-1)^{\epsilon_{2j}+\epsilon_{2j-1}}]$$

Again for $\epsilon_{2j} \neq \epsilon_{2j-1}$ the first term is 0, but the second term now becomes $$\pm 2(-1^{\sigma_{2j}}) \neq 0\ (\mathrm{mod}\ 5)$$

If $\epsilon_{2j}=\epsilon_{2j-1}$, then the second term is again 0, but the first term is then equal to:

$$+2(-1)^{\sigma_{2j-2}}(2_{j-1}-\alpha_{2j}) \neq 0\ (\mathrm{mod}\ 5)$$

since with $\epsilon_{2j}=\epsilon_{2j-1}$, there must be $\alpha_{2j} \neq \alpha_{2j-1}$ for $a_i \neq a_{i+1}$.

(3) Likewise, a confusion of $x0$ by $1x$ or vice versa is always discovered. This follows directly from the fact that the binary components of numerals 0 and 1 differ from each other so that the Equation 1 does not remain satisfied.

It follows from the foregoing that the only requirement to be exclusively placed by the second equation upon the terms dependent upon $\epsilon$, is that they form a function of $\epsilon_0, \epsilon_1 \ldots \epsilon_n$) which does not change the modulus 5 if equal values of $\epsilon_i$ and $\epsilon_{i+1}$ are exchanged for each other, but which does change the modulus 5 when unequal values of $\epsilon_i$ and $\epsilon_{i+1}$ are exchanged for each other. Alternative forms of the binary correction member for example are:

$$\epsilon_1+\epsilon_3+\epsilon_5+ \ldots \text{ of } \Sigma(-1)^i\epsilon_i \text{ of } \Sigma(-1)^{\sigma_i}$$

Also met is the requirement that the quinary portion of Equation 2 remains invariant by exchanging unequal values of $\epsilon_i$ and $\epsilon_{i+1}$.

*First embodiment (FIGS. 1 and 3 to 11)*

As mentioned, the logic diagram of the first embodiment of error detecting equipment according to the invention shown in FIG. 1, is based upon the Equations 1 and 2. In this apparatus, the symbols, namely the digit numerals of the number to be entered and the check digit, are applied as successive pulse sequences, for example by means of a selector disc K1 corresponding to a telephone dial switch. Such a dial switch may indeed be used for entering telephone numbers. The numeral 0 in this case corresponds to ten pulses.

As mentioned, the apparatus comprises three ring counters A1, C1 and D1 in the moduli 5, 2 and 2 respectively. Further provided is a counter stage B1 such as a shift register, which upon receipt of six or more pulses on its signal inputs remains in its final state reached, whereafter it must be reset to the starting state by applying a pulse to a reset input $r$. The output pulses from counters C1 and B1, as well as the original pulse from a timer member G are supplied to respective three inputs of a network gate E1 whose output is connected to the modulo-2 counter D1. A summing device F1 adds the supplied voltage values (0, 1) coming from the outputs of the respective counters C1 and D1. Denoted by L1 and M1 are output devices. Device M1 indicates or signals whether the number entered by means of the dial switch K1 including the check numeral is correct or faulty. Device L1 indicates the check numeral if only the number has been dialed.

As mentioned, the member G1 responds to the presence of a pulse sequence. The member G1 may consist, for example, of a delayed drop-off relay which is actuated at the commencement of the first pulse of a sequence and whose time delay is large enough to prevent the relay from dropping off in the pause between each two pulses of the sequence. The timing discriminator G1 thus remains actuated and passes the pulse signals until the entire pulse sequence is terminated. The minimum delay of member G1 corresponds to the number of counting steps in the limit counter B1. For example, the time delay must be sufficient to permit the counter B1 to count fully up to its limit such as six steps.

When a numeral is entered from the dial switch K1 by a corresponding sequence of pulses, the member G1 has responded and passes the pulse signals to the ring counter C1. This counter counts the pulses of the sequence in modulus 2. The same pulse sequences are also applied to the inputs of the limit counter B1 which counts a maximum of six pulses of a sequence and, after completion of each pulse sequence, is reset to 0 by a pulse received at the reset input $r$ from the timer G1. The ring counter D1 changes its state upon receipt of a sequence of more than five pulses. In other words, the state of the counter D1 represents:

$$\sigma_j = \sum_{i=0}^{j} \epsilon_i \ (\text{mod } 2)$$

As will be further described in the following, the change in the state of the modulo-2 counter D1 occurs either immediately upon appearance of the sixth pulse or only after the entire pulse sequence is completed, depending upon the state of the modulo-2 counter C1. During the next following appearance of the numeral $a_0, a_1 \ldots a_{2j-1}$, the counter C1 is in the state $2j \ (\text{mod } 2)$. That is, the counter C1 is then in the starting state. The result of the above-mentioned modulo-2 addition in summing device F1 determines the sign with which the counter A1 counts the pulses issuing when a numeral is being dialed; and this result, in turn, is determined by the respective states of the counters C1 and D1. Device F1 receives no voltage, and the counter A1 adds if the counters C1 and D1 are both in the starting state or both in the end state; but the device F1 receives voltage and the counter A1 subtracts if the counters C1 and D1 have respectively different states. The control of counter A1 to operate either additively or subtractively is effected through a control connection $f$ from the output of device F1.

After entering of numeral $a_{2j-1}$ the counter D1 is at $$\sigma_{2j-1} = \sum_{i=0}^{2j-1} \epsilon_i$$

(mod 2) and the sign, with which the counter A1 must count, is then $(-1)^{\sigma_{2j-1}}$.

Relative to the numeral $a_{2j}$, the following two cases are to be distinguished:

Case $a$: $\epsilon_{2j}=0$, i.e. $a_{2j}<6$

Since $\sigma_{2j}=\sigma_{2j-1}$, the sign for the counting operation of the counter A1 is also $(-1)^{2j}$; and this is the correct sign according to Equation 2b.

The $a_{2j}$ pulses are correctly counted by counter A1. Counter D1 does not change its state because the counter B1 does not count six pulses. Counter C1 reaches the end state, whereby the voltage in device F1 is changed.

On entering the numeral $a_{2j+1}$ it is therefore found that the sign for the activity of the counter A1 is $-(-1)^{\sigma_{2j}}$, in accordance with Equation 2b. The numeral $a_{2j+1}$ is also counted in the correct sense, irrespective of the value $\epsilon_{2j-1}$. That is, if $\epsilon_{2j+1}=1$, then with counter C1 in this end state, the counter D1 would change its state only after the member G1 had returned to the condition of rest, that is after the entire pulse sequence has been received. Since $\epsilon_{2j}=0$, no expedients need be observed for subtracting $2\epsilon_{2j}$.

Case b: $\epsilon_{2j}=1$, i.e. $a_{2j}>5$

The sign is $(-1)^{\sigma_{2j-1}}$, whereas it should be the reverse, namely $(-1)^{\sigma_{2j}}$, as will appear from a comparison with Equation 2b. Consequently the counter A1 commences to count the pulses in the wrong sense. However, as soon as the counter has received six pulses, the limit counter B1 has reached its end position. Since the ring counter C1 is in the starting state, the counter D1 is reset at this moment, so that the voltage in device F1 is changed and the counter A1 continues to count in the correct sense. As a result, the counter A1 has ultimately counted the total $$(-1)^{\sigma_{2j}}(\alpha_{2j}-\alpha_{2j+1}-2\epsilon_{2j}) \ (\text{mod } 5)$$

Counter C1 again resumes the end state, whereby the voltage in device F1 is again changed.

When entering the numeral $a_{2j+1}$, the sign for the action of the counter A1 is thus found to be $-(-1)^{\sigma_{2j}}$, which is in accordance with Equation 2b. The numeral $a_{2j+1}$ is therefore added in the correct sense as in case $a$.

In both cases, the counter A1 has added $$(-1)^{\sigma_{2j}}(\alpha_{2j}-\alpha_{2j+1}-2\epsilon_{2j}) \ (\text{mod } 5)$$

as is required by the Equation 2b.

The entering of a number with a check numeral is supposed to bring the counter A1 to the zero state. As a further criterion, it can be assumed in accordance with Equation 1 that the counter D1 must also be in the zero state. The devices L1 and M1 must then be controlled by the counters A1 and D1. Since the states of respective counters C1 and D1 determine the voltage in summing device F1, the value 0 of this voltage may be taken as a further criterion; that is the accuracy of the equation $$\Sigma \epsilon_i + n + 1 = 0 \ (\text{mod } 2)$$

can thus be checked.

For numbers relative to which $n$ is even, the counter D1 must then be in the end state, and for numerals with an odd $n$, the counter D1 must be in the starting state. Such a variant is possible because it is not necessary that the second term of the Equation 1 assume value 0. The control of the members L1 and M1 may also be predicated upon the assumption that this second term has a different, fixed (given) value which is also dependent upon the length of the number.

Figure 3:
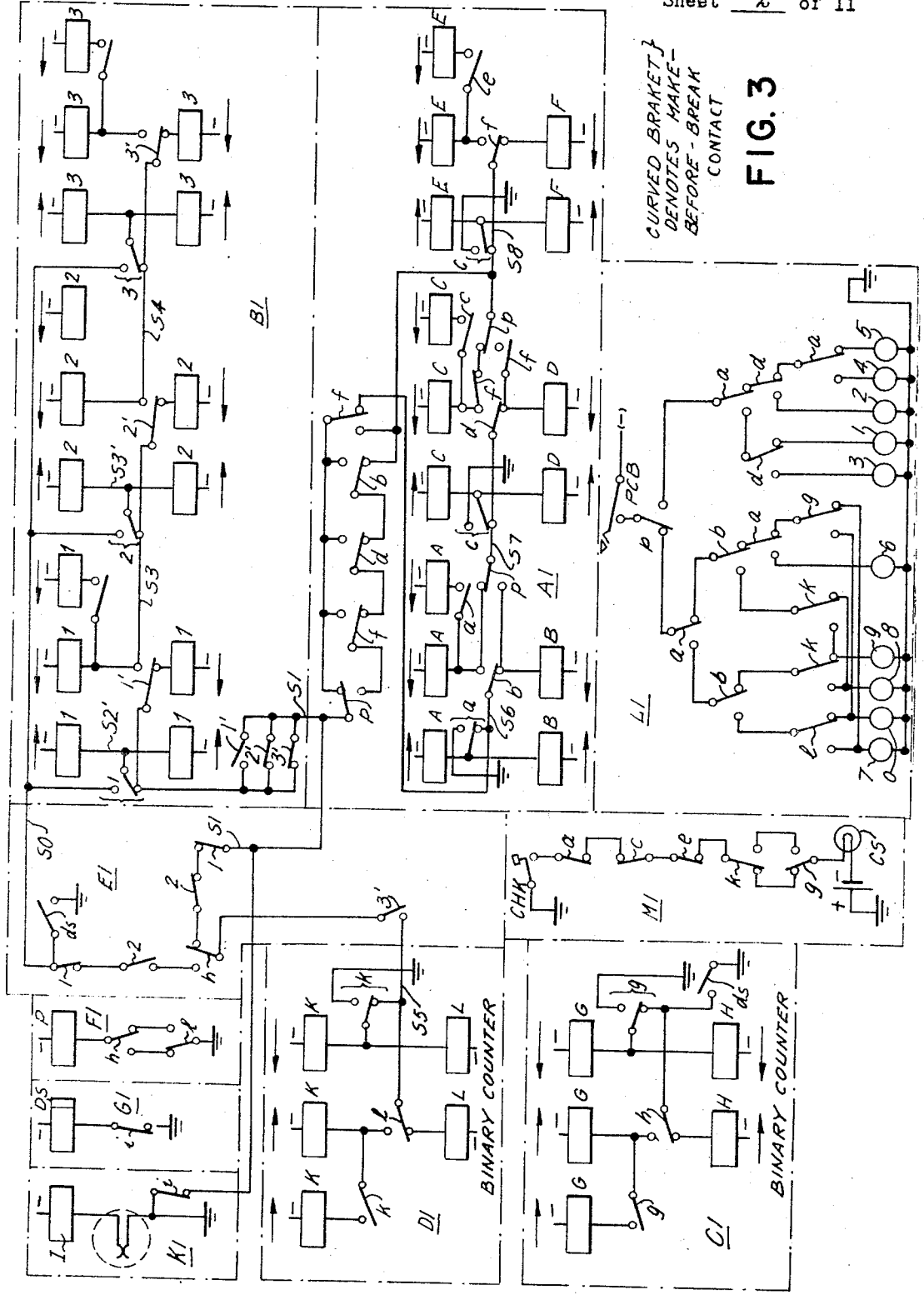
FIG. 3 is a straight-line circuit diagram of a checking system according to FIG. 1.

The circuit diagram shown in FIG. 3 is in accordance with a system built and operating in the above-described manner in a library where the readers are to pick the index numbers of books from catalog cards and dial them on a standard telephone. If the number is correct, the telephone informs the reader of its availability and the approximate waiting time, while the system also signals the number to the attendants in the stock room. If the number is incorrect, the reader is asked over the telephone to check and redial the number, the information in either case being automatically given from tape recordings.

Figure 4:
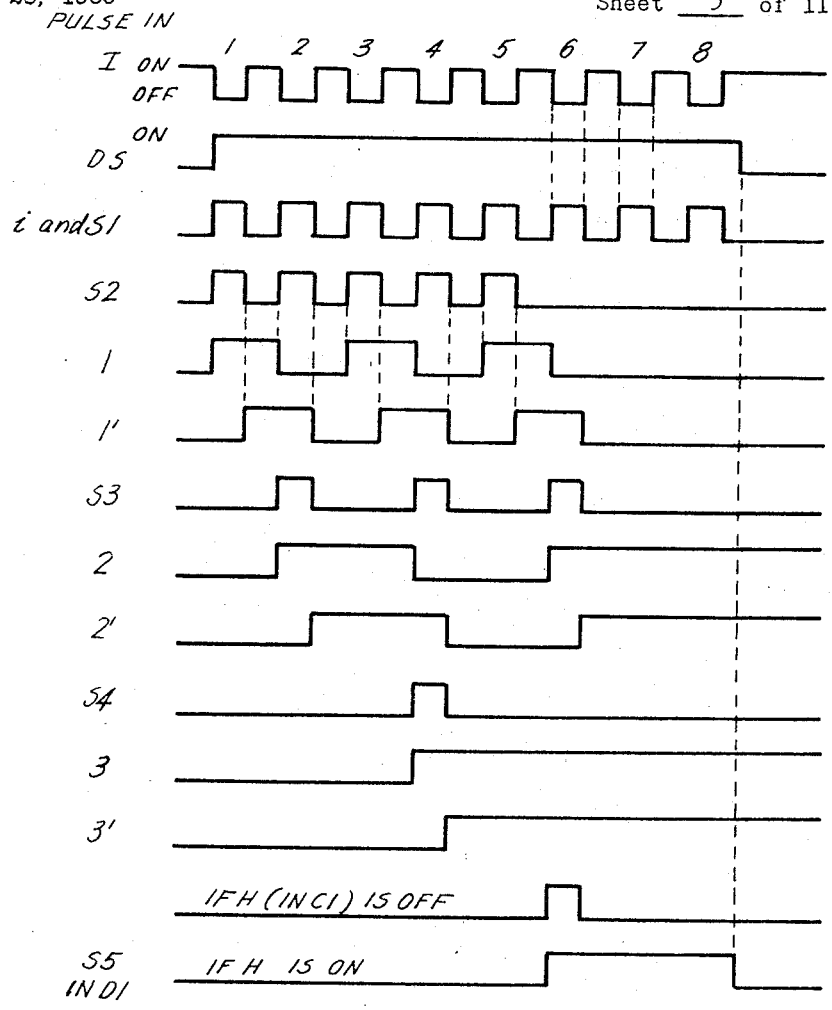
FIGS. 4 to 11 are explanatory pulse diagrams relating to the operation of the system according of FIGS. 1 and 3.

The diagram of FIG. 3 corresponds to the above explained logic diagram of FIG. 1, the same reference characters K1, G1, C1, D1, A1, B1, E1, F1 and L1 being used for identifying the main logic components. These components are composed of telephone relays, the switching speed thus obtainable being ample for the intended purpose. The relay coils are denoted by capital letters such as I, DS, E, A, D, and also by numerals 1, 1', 2, 2', 3, 3'. Lower case letters denote relay contacts and are shown in the normally occupied positions. For example, dial switch relay I has three contacts $i$ in devices G1, E1 and F1 respectively. Contact $i$ in timer device G1 energizes relay DS for each individual pulse, such as for each of the eight pulses when the numeral 8 is being dialed in K1 (FIG. 4). DS has a time-delayed drop-out so as to remain picked up for slightly more than a single pulse duration. Consequently, relay DS stays picked up for the duration of the entire pulse train, for example during all eight pulses denoting the numeral 8 (FIG. 4). DS has two normally open contacts $ds$ in respective devices E1 and C1.

In the binary counter C1, the contact $ds$ applies a single pulse for each complete sequence. Hence the counter C1 counts the number of digit positions or pulse sequences.

A relay P in device F1 is energized under control by contacts $h$ and $l$ of respective relays H and L in counters C1 and D1 so as to be energized only if either relay H or relay L is energized but not when both relays H, L are energized or deenergized simultaneously. Thus the relay P is active only when C1 and D1 are in respectively different counting states. Relay P has three contacts $p$ in the quinary ring counter A1 and one contact $p$ in the check-symbol indicator device L1.

The counter C1 is a flip-flop composed of two differential relays H, G of which one has two coils (H) and the other has three coils (G). Two of the three G coils are cumulative and jointly operate in magnetic opposition to the third G coil, as is indicated by arrows. When contact DS in C1 closes as mentioned above, the two mutually opposed coils H are both excited so that their effects cancel each other, and only one coil G is energized and closes its self-holding $g$ contact which connects the $g$ coil to the plus pole (ground), thus holding this one G coil energized. The other, normally open $g$ contact in C1 closes, but the two other G coils connected thereto remain deenergized because contact $h$ in C1 is open. The G relay then energized, actuates its other $g$ contacts in devices F and L1 to provide a signal of the counting state of C1.

When the pulse sequence from K1 is terminated so that DS drops off and opens the contact DS in C1, the G relay remains energized through its self-holding contact $g$, and no change occurs in the state of the binary counter C1.

When the next pulse train commences, contact DS in C1 closes. The current through contact DS then flows through contact $h$ and through only one of coils H so that the H relay picks up. It switches the contact $h$ in C1 and energizes the two left G coils which jointly oppose the energized right coil G. Hence the G relay drops off and its self-holding contact $g$ energizes the second H coil. The H relay remains picked up until shortly after the pulse duration, at which time the contact $ds$ opens. Since H is picked up, it actuates its contact $h$ in device F1.

The binary counter D1 operates analogously as a 2-bit flip-flop.

The register B1 operating as a 6-bit counter comprises differential relays 1 and 1' which operate as a flip-flop in a manner similar to that explained above with reference to C1. The register further comprises two further flip-flops 2,2' and 3,3'. The operation of register B1 is as follows.

The contact $ds$ in device E1 closes at the beginning of a pulse sequence and opens after the termination of a complete sequence, as explained above. Normally the relay I of dial switch K is energized and hence the two relay contacts $i$ in respective devices G1 and E1 are open. The counting pulses from K1 are applied by repeatedly deenergizing the relay I and correspondingly closing these two contacts $i$.

Thus, the first pulse causes the $i$-contact to close for the length of the individual pulse and to apply plus potential (ground) through signal lead $s1$, contacts 2', 3', lead $s2$, contact 1, lead $s2'$ and contact 1' to both relay coils 1' whose effects cancel each other, and also through only the left one of coils 1, so that relay 1 is picked up and connects its self-holding contact 1 through contact $ds$ in device E1 to the plus pole (ground). The second contact 1 in register B also closes, but this has no effect since the two left coils 1 are deenergized.

When the first pulse is terminated and pulse contact $i$ reopens, the left coils 1 and 1' remain energized through lead $s2'$, self-holding contact 1, lead $s0$ and contact $ds$. Since now only the left coil of relay 1' is energized, this relay picks up and closes its 1' contacts. After termination of the first pulse, therefore, both relays 1 and 1' are picked up. That is, the flip-flop 1–1' is then in the "on" state, as is indicated in Table 2.

TABLE 2

| Digit Value | States of Flip-Flops in Register B1 | | |
|---|---|---|---|
| | 1–1' | 2–2' | 3–3' |
| 1 | On | | |
| 2 | | On | |
| 3 | On | On | |
| 4 | | | On |
| 5 | On | | On |
| 6 | | On | On |
| 7 | On | On | On |
| 8 | | On | On |
| 9 | On | On | On |
| 10 | | On | On |

The second pulse again causes contact $i$ to close. This energizes both coils 2' and the left coil 2 of the second flip-flop through $i$–$s1$–$s2$–1'–$s3$–$s3'$. Relay 2 picks up and closes its self-holding contact 2. When the second pulse is terminated and the $i$ contact opens, the right coil 2' is no longer energized, whereas the left coil 2' remains energized through $ds$–$s0$–2–$s3'$ so that the 2' relay picks up and closes its contact 2' connecting lead $s3$ with lead $s4$. The second flip-flop 2–2' is then in the "on" state. The first flip-flop 1–1', however, has been reset to "off" condition because the second pulse also energized the right coils 1, so that all three 1 coils were active and magnetically cancelled their effects to make the 1 relay drop off.

In lieu of a further description of details, apparent to those skilled in the art from the foregoing explanations in conjunction with the circuit diagram of FIG. 3, reference is made to Table 2 and FIG. 4 which conjointly represent the counting operation of register B1 in a synoptic and more readily understandable fashion. FIG. 4 relates to a sequence of eight pulses denoting number "8" which is dialed in device K1 and causes the relay I to drop off eight times, as is schematically indicated in the uppermost pulse-time graph of FIG. 4. As shown, the relay DS in device G1 remains energized slightly longer than the entire duration of all eight pulses. The pulse contact $i$ issues eight pulses to lead $s1$. It will be noted that the relay I in conjunction with its contact $i$ operates as an inverter which inverts the signals of the relay I in device K1. Indicated in FIG. 4 are the occurrence and duration of the pulses appearing on leads $s1$, $s2$, $s3$, $s4$ and $s5$ in FIG. 3, as well as the corresponding pulses in the relay coils 1, 1', 2, 2', 3, 3'.

It will be seen from Table 2 that the combination of three flip-flops constituted by the relays 1 and 1', 2 and 2', 3 and 3' performs a change of state in at least one of them until six pulses are counted, whereafter no further change takes place until the entire pulse sequence is terminated and the register B1 is reset. The result of these operations, in conjuntcion with the performance of the other system components, will be further explained with reference to a numerical example, after describing the quinary counter A1.

As will be seen from FIG. 3, all of the flip-flops 1–1', 2–2', 3–3' which in register B1 are in the "on" state at the end of any pulse sequence, are reset to the "off" state when, shortly after termination of the sequence, the relay DS in device G1 drops off (see FIG. 4) and thus opens the contact $ds$ in device E1, thus deenergizing any previously energized relay circuits.

The quinary ring counter A1 is composed of three flip-flops consisting of the relays A and B, C and D, E and F. In the following these flip-flops will be designated AB, CD and EF respectively. When a pulse is offered on lead $s6$ (FIG. 3) by closing of pulse contact $i$, the flip-flop AB changes its state. When a pulse is offered on lead $s7$, the flip-flop CD changes its state, while flip-flop EF does so when a pulse appears on lead $s8$. The counter A1 has five stable states indicated in Table 3.

TABLE 3

| State | Flip Flop | | |
|---|---|---|---|
| | AB | CD | EF |
| 1 | On | Off | Off |
| 2 | Off | On | Off |
| 3 | On | On | Off |
| 4 | Off | Off | On |
| 0 | Off | Off | Off |

Suppose that relay P in summing device F1 (FIG. 3) is deenergized as shown. Then the following Table 4 indicates whether a pulse applied to lead $s1$ will appear on lead $s6$, $s7$ or $s8$.

TABLE 4

| State | Lead | | |
|---|---|---|---|
| | $s6$ | $s7$ | $s8$ |
| 0 | Yes | No | No |
| 1 | Yes | Yes | No |
| 2 | Yes | No | No |
| 3 | Yes | Yes | Yes |
| 4 | No | No | Yes |

The conditions represented by Table 4 follow from the fact that the relay P of device F1 closes its two $p$ contacts in counter A1. Taking, for instance, state 1 according to Table 4, it will be seen from Table 3 that the flip-flops AB and CD must change their respective states to reach state 2 (Tables 3 and 4). During the one pulse which shifts the ring counter A1 from the original state 0 to state 1, the relays B, D and F in counter A1 remain in the original state, so that the corresponding contacts $b$, $d$ and $f$ in counter A1 retain the positions shown in FIG. 3. Pursuing the sequence of pulses in the same manner through an entire quinary cycle, it will be seen that the following diagram of states for counter A1 is embodied in the counting operation, corresponding to an additive performance:

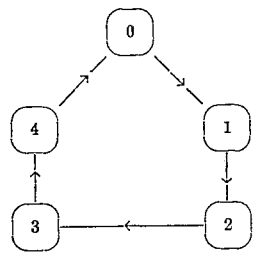

However, when relay P in summing device F1 is energized, Table 4 does not apply, and the pulse offered at pulse input lead $s1$ appears on leads $s6$, $s7$ or $s8$ in accordance with the following Table 5.

TABLE 5

| State | Lead | | |
|---|---|---|---|
| | $s6$ | $s7$ | $s8$ |
| 0 | No | No | Yes |
| 1 | Yes | No | No |
| 2 | Yes | Yes | No |
| 3 | Yes | No | No |
| 4 | Yes | Yes | Yes |

Accordingly the diagram of states then also changes and may be represented as follows:

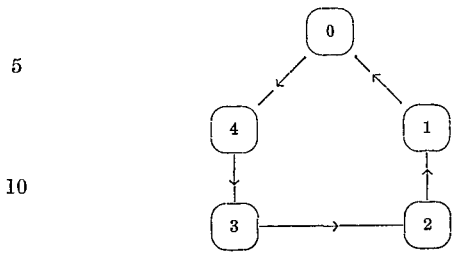

This shows that the quinary counter A1 counts the pulses on input lead $s1$ in the clockwise sense when relay P is off, and counterclockwise when relay P is on.

Figure 5:
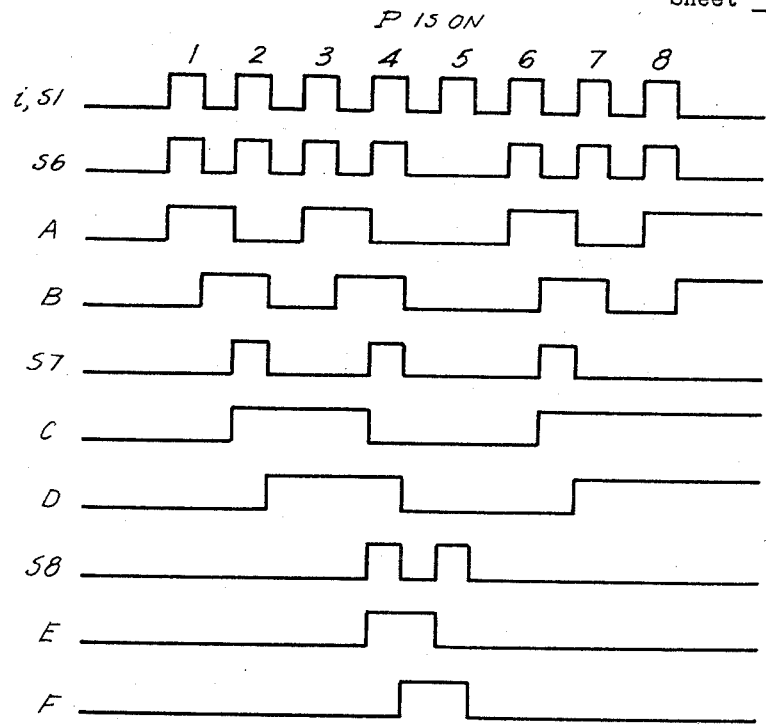
Figure 6:
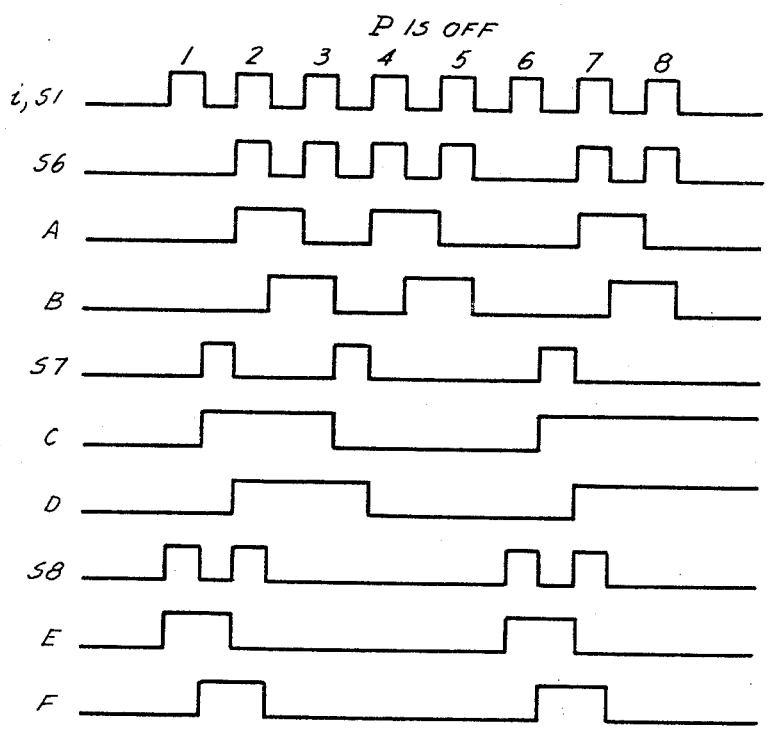

A pulse-time diagram for the quinary counter A1 relating to additive counting (relay P energized) is shown in FIG. 5 in the same fashion as the above explained pulse diagram of FIG. 4, and with reference to the leads $s1$, $s6$, $s7$, $s8$ and relays A to F shown in FIG. 3. FIG. 6 is a corresponding pulse-time diagram for subtractive counting of the quinary counter A1 (relay P deenergized). Both diagrams exemplify a sequence of 8 pulses being dialed and thus appearing inverted on the pulse lead $s1$.

As mentioned, the device L1 shown in FIGS. 1 and 3 permits determining the check numeral after the number or character group has been entered without the check digit. As shown in FIG. 3, the device L1 in the illustrated embodiment is essentially an electrical replica of a matrix in which the ten digit values from 1 . . . 0 are represented by indicators such as numbered lamps which in FIG. 3 are shown only as numerals 1 . . . 0. These indicators are interwired with a current supply under control by the various relay contacts so as to indicate the proper check numeral upon entering of all preceding digits, it being only necessary to actuate a push button PBC.

The second indicator device M1 serves to check whether the entered group of numerals, including the check symbol, is correct. This device has a normally open check key CHK wired to an indicator signal CS, such as a lamp, through relay contacts $a$, $c$, $e$, $k$ and $g$ as shown in FIG. 3. After entering all digit values, the attendant depresses the key or push button CHK, and the signal CS will then respond only if the entered number with the check numeral is correct.

*Numerical example*

The following numerical example relates to the number 39059 of which the last digit 9 is the check symbol, as will be explained. Reference will be made to the pulse diagrams shown in FIGS. 7 to 11.

Before the numeral 3 is dialed, counters C1, D1 and A1 are in zero position. This is the start condition indicated in Table No. 6.

TABLE 6.—COUNTER STATES FOR NUMERAL 39059

| Digit Position | Digit Value | C1 | D1 | A1 |
|---|---|---|---|---|
| Start | | 0 | 0 | 0 |
| 1 | 3 | 1 | 0 | 2 |
| 2 | 9 | 0 | 1 | 1 |
| 3 | 0 | 1 | 0 | 3 |
| 4 | 5 | 0 | 0 | 3 |
| 5=Check Symbol | 9 | 1 | 1 | 0 |

Figure 7:
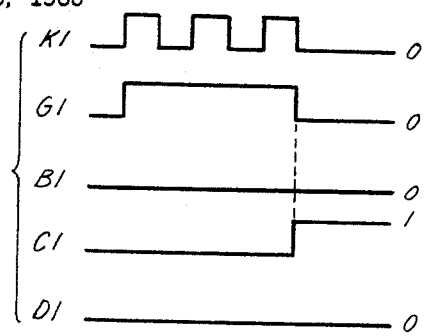

All three pulses from dial K1 are counted by counter A1 (FIGS. 1, 3, 7). Since C1 and D1 are in the same positions, counter A1 will substrtct. (It should be noted that counter A1 may also be made to add, as long as the operations "adding" and "subtracting" art consistently performed for given respective conditions of $C1/D1$). During the three pulses, the device G1 (time relay DS is FIG. 3) remains energized (FIG. 7). At the end of the pulse sequence, the counter A1 is at 2. Since $0-3 \pmod 5 = 2$, C1 changes its position, D1 remains at 0. At the end of the first pulse sequence, C1 is at 1, D1 is at 0, and A1 is at 2 (FIG. 7, Table 6).

Figure 8:
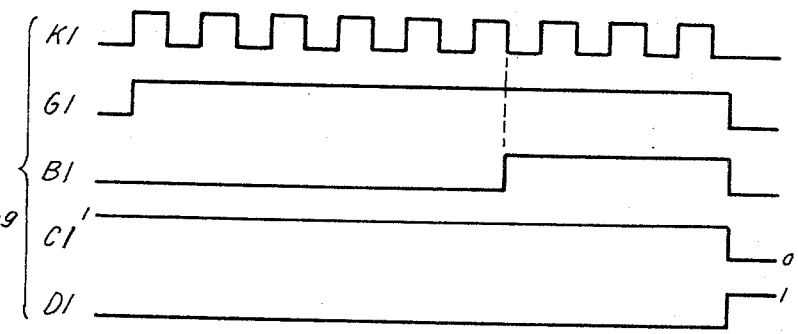

We now dial the second digit 9. K1 issues nine pulses (FIG. 8). G1 issues a single pulse whose length corresponds to the entire sequence of 9 counting pulses. The 6-bit counter B1 is always reset by G1 at the end of a pulse sequence. Hence, when entering the digit value 9, the counter B1 starts counting from zero and reaches the end position at the end of the sixth pulse from K1 (FIG. 8). The device E1 is so designed that when C is at 1, the setting of D1 is changed only at the end of the signal from G1, provided B1 had reached the end position, i.e., had counted 6 steps. As a result, neither D1 nor C1 perform any operation during the entire sequence of nine pulses. However, all nine pulses are counted by the quinary counter A1 in the sense determined by the initial settings of C1 and D1 which were at 1 and at 0 respectively. That is, all nine pulses were counted additively. The counter A1 started out at 2. Since 2+9(mod 5)=1, the new position of counter A1 is at 1 after entering the second digit (FIG. 8, Table 6).

Figure 9:
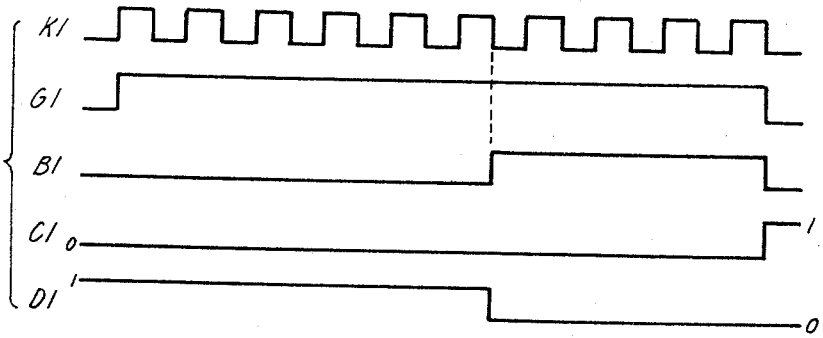

The third digit value is 0. K1 issues ten pulses (FIG. 9). The device G1 stays on for the entire duration of the ten pulses. Counter B1 counts six pulses and then goes to the "on" position which it retains till the end of the entire sequence. Counter C1 starts from the 0 position and is switched to position 1 only at the end of the entire sequence when the counter C1 receives a switching signal from G1. The counter D1 starts from position 1. As soon as the counter B1 reaches its end position, it switches the counter D1 to position 0 because at that moment the counter C1 is also in the position 0, and the device E1 switches D1 immediately when counter B1 is in its end position if the counter C1 is simulaneously in position 0. Counter C1 in effect counts the number of digits (mod 2), and counter D1 counts the occurrence of digits whose numerical value is above 5 (0 being considered to have the value 10). When C1 is in position 1, it delays the counting operation of D1 until the end of the sequence signalled by G1. Counter A1 commences to start adding the first six pulses of the sequence, but when D1 changes its position (FIG. 9), tht counter A1 starts to subtract the remainder of four pulses. Counter A1 started in position 1 (Table 6). After adding 6, it has reached the position 1+6(mod 2)=2. From this it substracts 4. Thus 2−4(mod 5)=3 is the end position of A1.

Figure 10:
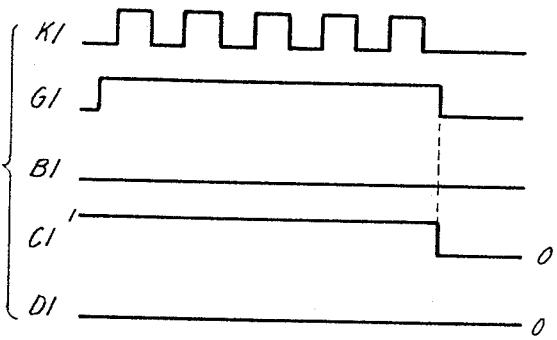

The fourth digit is 5. FIG. 10 indicates the operation of K1, B1, C1 and D1. B1 does not count up to six steps and therefore does not change its condition. C1 starts in position 1 and changes to position 0 at the end of the sequence when receiving a signal from G1. D1 starts at 0 and does not change its position, because B1 does not change. At the end, C1 is at 0, D1 is at 0 and A1 has added five steps 3+(mod 5)=3 (Table 6).

We have now dialed all but the last digit of the chosen numeral 39059. This last digit constitutes the added check symbol. Hence it cannot be arbitrarily chosen but is fixed for given checking conditions. In the present example, the checking conditions require that after entering the entire numeral including the added check numtral, the quinary counter A1 shall be at zero, and the counters C1, D1 are to be in the same positions (0, 0 or 1, 1) respectively. Based on these conditions, the matrix shown in Table 7 can bet set up, showing in the column A1 the position reached by counter A1 by entering the penultimatt digit and showing in the horizontal top row the four possible positional relations of C1/D1.

TABLE 7.—CHECK NUMERALS

| A1 | C1/D1 | | | |
|---|---|---|---|---|
|  | 0/0 | 0/1 | 1/0 | 1/1 |
| 0 | 7 | 5 | 5 | 0 |
| 1 | 6 | 4 | 4 | 6 |
| 2 | 0 | 3 | 3 | 7 |
| 3 | 9 | 2 | 2 | 8 |
| 4 | 8 | 1 | 1 | 9 |

The check digit can simply be taken from the computed Table 7. Since the penultimate (fourth) digit placed A1 at 3 and C1/D1 at 0/0 (Table 6), we find from Table 7 that the last (check) digit must be 9.

Of course, the matrix of Table 7 can be embodied by correspondingly wired electrical components (device L1 in FIGS. 1 and 3), so that we need only actuate a push-botton contact PBC of decice L1 (FIG. 3) to make it indicate the check numeral, as will be more fully described hereinafter.

Figure 11:
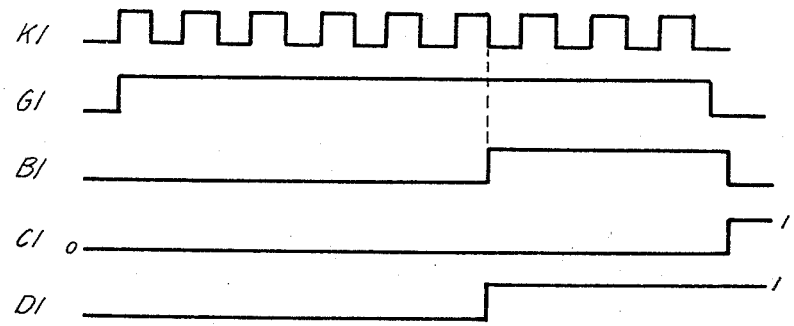

If we now dial the check numeral 9, the following happens (FIG. 11, Table 6). Since C1 started at 0, the position of D1 changes as soon as the six-bit counter B1 reaches the end position. Since C1 and D1 were in the same 0 positions during the first six pulses, the counter A1 starts to subtract six pulses. The seventh, eighth and ninth pulses are then added because now C1 and D1 are in respectively different positions: 3−6+3(mod 5)=0. Thus entering the check numeral 9 results in placing the counter A1 at 0. At the same time, the counters C1 and D1 are both at 1, i.e. both in the same positions. This is indicative of the correctness of the entered number.

It should be understood that the above-described example of performing a check with counter A1 ultimately at 0 and counters C1 and D1 ultimately in the same respective positions is arbitrary. There are a total of ten different possibilities of checking of which any one may be selected. That is, the check may be made for counter A1 in any of the other four states (1, 2, 3, 4) and for counters C1, D1 in either the same states (0/0, 1/1) or in different states (0/1, 1/0). Once a set of these ten available combinations of conditions is chosen, a corresponding matrix of check numerals will result, and a check numeral satisfying one chosen set of conditions does not apply to another set.

Reverting to the numerical example, if any error is made within a single digit of the number by exchanging two adjacent digits for each other, the entering of the number with the check symbol will not result in the prescribed final result in which A1 is at 0 and C1, D1 are in the same positions. This holds true if the error concerns the check symbol alone, or if it resides in confusing the check symbol with the adjacent digit value.

*Second embodiment (FIG. 2)*

Figure 2:
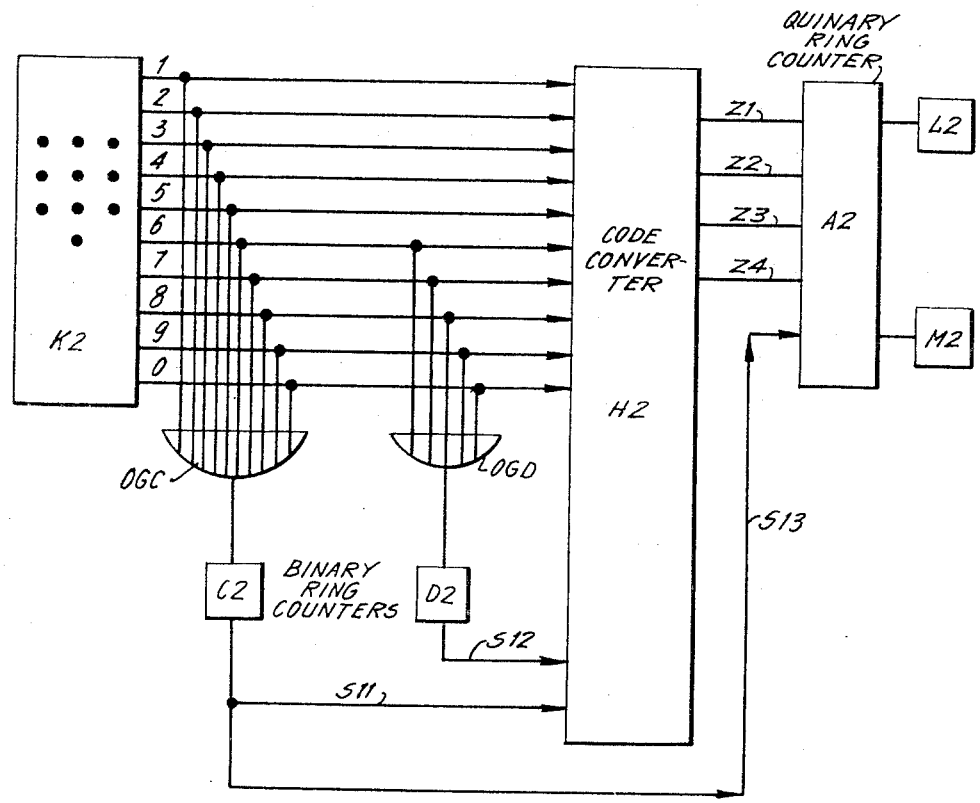
FIG. 2 is a block diagram of a second embodiment of the checking system of the present invention also relating to the processing of decimal character groups but operating with sequential parallel entry of the digits.

As mentioned, the system schematically shown in FIG. 2 is also based upon the Equations 1 and 2. In this device the numerals for the respective digit positions of the number, including the check numeral, are entered in parallel relation by respective pulses passing through separate conductors 1 . . . 0, one for each of the ten numerals. For entering each numeral, one of the ten keys of a keyboard K2 is to be depressed. The apparatus comprises ring counters A2, C2 and B2 in the moduli 5, 2 and 2 respectively. Also provided is a code converter H2. The output device M2 indicates in a suitable manner whether the entered number with the check numeral is correct or false, and the output device indicates the check numeral if the number alone is entered into the keyboard K2.

Upon depressing a key of keyboard K2, a pulse passes through an OR gate OGC to the ring counter C2 which counts the supplied numerals (digit positions) in modulus 2. For numerals 6, 7, 8, 9 and 0 the pulse passes additionally through another OR gate OGD to the ring counter D2 whose state, therefore, represents $$\sigma_j = \sum_{i=0}^{j} \epsilon_i (\text{mod } 2)$$

For any of the entered numerals, a pulse is also supplied through the corresponding one of the ten conductors 1 . . . 0 to the code converter H2 which has two further inputs $s11$; $s12$ connected with the respective outputs of the binary ring counters C2 and D2. Also for each entered numeral, a pulse is supplied to one of the inputs $s13$ of the ring counter A2 operating in modulus 5 providing the algebraic addition (mod 5) in accordance with the Equation 2. It is to be calculated from this equation how may states of the counter A2 must be suppressed, commencing from the state of the counter D2 which represents the sum (mod 2) of the binary components of the already supplied numerals, and based upon the state of the counter C2, i.e. the number $j$ (mod 2) of the already supplied numerals, when the next following key is being depressed. The result of the calculation with respect to the number of steps located between the old and the new state of the counter is apparent from Table No. 8.

TABLE 8

| Numeral Entered | Counting Steps (Z) of Quinary Counter A2 | | | |
|---|---|---|---|---|
| 1 | 1 | 4 | 4 | 1 |
| 2 | 2 | 3 | 3 | 2 |
| 3 | 3 | 2 | 2 | 3 |
| 4 | 4 | 1 | 1 | 4 |
| 5 | 0 | 0 | 0 | 0 |
| 6 | 1 | 4 | 4 | 1 |
| 7 | 0 | 0 | 3 | 2 |
| 8 | 4 | 1 | 2 | 3 |
| 9 | 3 | 2 | 1 | 4 |
| 0 | 2 | 3 | 0 | 0 |
| Old State C2/D2 | 0/0 | 0/1 | 1/0 | 1/1 |

If counter C2 was in the 0-state and counter D2 in the 1-state, the quinary counter A2, according to the tabulation, must occupy the state 1 when the key 8 is being depressed; if both counters C2 and D2 were in the 0-state when key 8 is being depressed, three states of the quinary counter A2 must be suppressed so that the counter A2 will occupy the state 4. When depressing the key 5, no change in the 0-state of the counter A2 must occur regardless of the states occupied by the respective binary counters C2 and D2.

To meet these requirements, the system is provided with the code converted H2 which has four outputs Z1, Z2, Z3, and Z4 connected with respective four inputs of the quinary ring counter A2. When depressing a key in keyboard K2, there appears a change in voltage on none, or a selected one of the outputs Z1 to Z4 which produces the desired suppression of states in counter A2. A voltage change in output Z4 results in a suppression of three counting states and thus sets the counter A2 four steps ahead when a key is being depressed.

When the counter A2 is equipped with transistor stages, the operation just described can ge secured, for example, by taking care that the supply of the pulse is effected through capacitors to the bases of the transistors. Connected to both sides of such capacitors must be the outputs of other transistor stages as well as outputs of the code converter H2. In this manner the supply of a pulse can be made to cause only the one desired counter state.

The entering of a digital number with a check numeral must bring the counter A2 to the zero state (or other pre-selected state). As a further criterion, it may be assumed, in accordance with Equation 1 that the binary counter D2 must also be in the zero state. The output members L2 and M2 are correspondingly controlled from the counters A2 and D2.

Instead of having the counter C2 add the supplied numerals in modulus 2, the counter may also be used for determining the number of numeral pulses augmented by the modulo 2 sum of the binary components of the numeral, which results in the same sum as obtained in the summing device F1 in FIG. 1. In this case, when setting up a table in analogy to Table 8, the states which the quinary counter A2 must indicate are to be related to the old C2/D2 counter states 0/0, 1/1, 1/0 and 0/1.

The embodiment according to FIG. 2 affords greater flexiblty in comparison with that of FIG. 1 because it can be readily changed for a different assignment of the values $\alpha$ and $\epsilon$. If one wants to use a different function for those terms of the second equation which depend only upon $\epsilon$, then the embodiment of FIG. 2 can likewise be readily adapted accordingly. In both cases, the number of counting steps for the counter A2 in Table 8 must be changed, which requires an exchange of a few electrical connections in the logic circuitry. In the former case, it is also necessary to supply a pulse to the counter D2 for different numerals, which involves connecting these other conductors with the OR-gate OGD preceding the counter D2.

Devices according to FIGS. 1, 2 and 3, of course, may be equipped with a variety of modular components, such as relays, tubes, transistors, diodes, well known and commercially available for such purposes. This will be exemplified by the embodiment of the systems shown in FIGS. 12 to 15 and described presently.

*Third embodiment (FIGS. 12 to 15)*

The system illustrated in FIGS. 12 to 15 utilizes the invention for controlling an accounting machine in such a manner that the machine will commence operating only if an initially posted multi-digit number, such as the account number of a customer, is correct. Since the system is based upon fundamental features described above with reference to FIG. 2, it will be helpful to briefly recapitulate some of these features.

In the system of FIG. 2 a multi-digit decimal number is checked by computing a check symbol (Z) which is taken from the available ten numerals 1 . . . 0 and added to the number as the last digit thereof. The individual digit values are then added in modulus 5 and a check made as to whether the result in equal to zero, and whether the modulo-2 sum of those digit positions whose respective values are more than 5 is also equal to zero. The added check numeral (Z) depends upon two binary input variables $C_2$ and $D_2$, which in FIG. 2 are counted by respective modulo-2 counters C2 and D2. $C_2=1$ for each even odd digit position, and $C_2=0$ for each digit position. The value of $D_2$ indicates the modulo-2 sum of the digits in which the digit value is more than 5. When the digit positions of a higher value than 5 amount to an even number, the value of $D_2=0$; when the number of these digit positions is odd, the value of $D_2=1$. The additional check numerals Z are listed in Table 8.

The modification system of FIGS. 12 to 15 incorporates a somewhat different correlation of counter positions and check numerals, as will be explained presently. The following Table 9 corresponds to Table 8, except that a horizontal division line is inserted between numerals 5 and 6 in the first vertical column denoting the entered decimal digit values. As a result, Table 9 then comprises eight groups of five check numerals Z.

TABLE 9

| Numeral Entered | Check Values Z | | | |
|---|---|---|---|---|
| 1 | 1 | 4 | 4 | 1 |
| 2 | 2 | 3 | 3 | 2 |
| Ⓐ 3 | 3 Ⓐ | 2 Ⓑ | 2 Ⓑ | 3 Ⓐ |
| 4 | 4 | 1 | 1 | 4 |
| 5 | 0 | 0 | 0 | 0 |
| 6 | 1 | 4 | 4 | 1 |
| 7 | 0 | 0 | 3 | 2 |
| Ⓐ 8 | 4 Ⓒ | 1 Ⓓ | 2 Ⓑ | 3 Ⓐ |
| 9 | 3 | 2 | 1 | 4 |
| 0 | 2 | 3 | 0 | 0 |
| Old State | 0/0 | 0/1 | 1/0 | 1/1 |
| $C_2/D_2$ | $(\bar{C}_2\bar{D}_2)$ | $(\bar{C}_2 D_2)$ | $(C_2 \bar{D}_2)$ | $(C_2 D_2)$ |

It will be seen that the three groups denoted by Ⓐ are identical. Three other groups, denoted by Ⓑ are also identical among themselves; and there are two additional groups denoted by Ⓒ and Ⓓ. Consequently, there are only four different groupings of check numerals, namely the groups Ⓐ, Ⓑ, Ⓒ and Ⓓ.

For distinguishing between the upper and the lower half of the Table 9 (numerals 1 to 5 and numerals 6 to 0), we introduce two further input variables Q (for numerals above 5) and $\bar{Q}$ (for numerals 1 to 5).

Consequently, the automatic computation of the check numerals can be effected in a four-group matrix as shown in Table 10.

TABLE 10

| | $C_2/D_2$ | | | |
|---|---|---|---|---|
| | 0/0 | 0/1 | 1/0 | 1/1 |
| | A | B | C | D |
| 1, 6 | Z1 | Z4 | Z1 | Z4 |
| 2, 7 | Z2 | Z3 | | |
| 3, 8 | Z3 | Z2 | Z4 | Z1 |
| 4, 9 | Z4 | Z1 | Z3 | Z2 |
| 5, 0 | | | Z2 | Z3 |

In the matrix of Table 10, the ten input variables from 1 to 0 are grouped together as: 1, 6–2, 7–3, 8–4, 9–5, 0. Also supplied to the matrix are the auxiliary variables A, B, C and D. The matrix exhibits four different output values, namely Z1 and Z4, and thus would require four corresponding output leads.

The computation of the auxiliary variables is in accordance with the following equations.

$$A = \overline{C}_2 \cdot \overline{D}_2 \cdot \overline{Q} \text{ or } C_2 D_2 \overline{Q} \text{ or } C_2 D_2 Q$$
$$B = \overline{C}_2 \cdot D_2 \cdot \overline{Q} \text{ or } C_2 \overline{D}_2 \overline{Q} \text{ or } C_2 \overline{D}_2 Q$$
$$C = \overline{C}_2 \cdot \overline{D}_2 \cdot Q$$
$$D = \overline{C}_2 \cdot D_2 \cdot Q$$

This can be simplified to:

$$A = \overline{C}_2 \cdot \overline{D}_2 \cdot \overline{Q} \text{ or } C_2 D_2$$
$$B = \overline{C}_2 \cdot D_2 \cdot \overline{Q} \text{ or } C_2 \overline{D}_2$$
$$C = \overline{C}_2 \cdot \overline{D}_2 \cdot Q$$
$$D = \overline{C}_2 \cdot D_2 \cdot Q$$

Figure 12A:
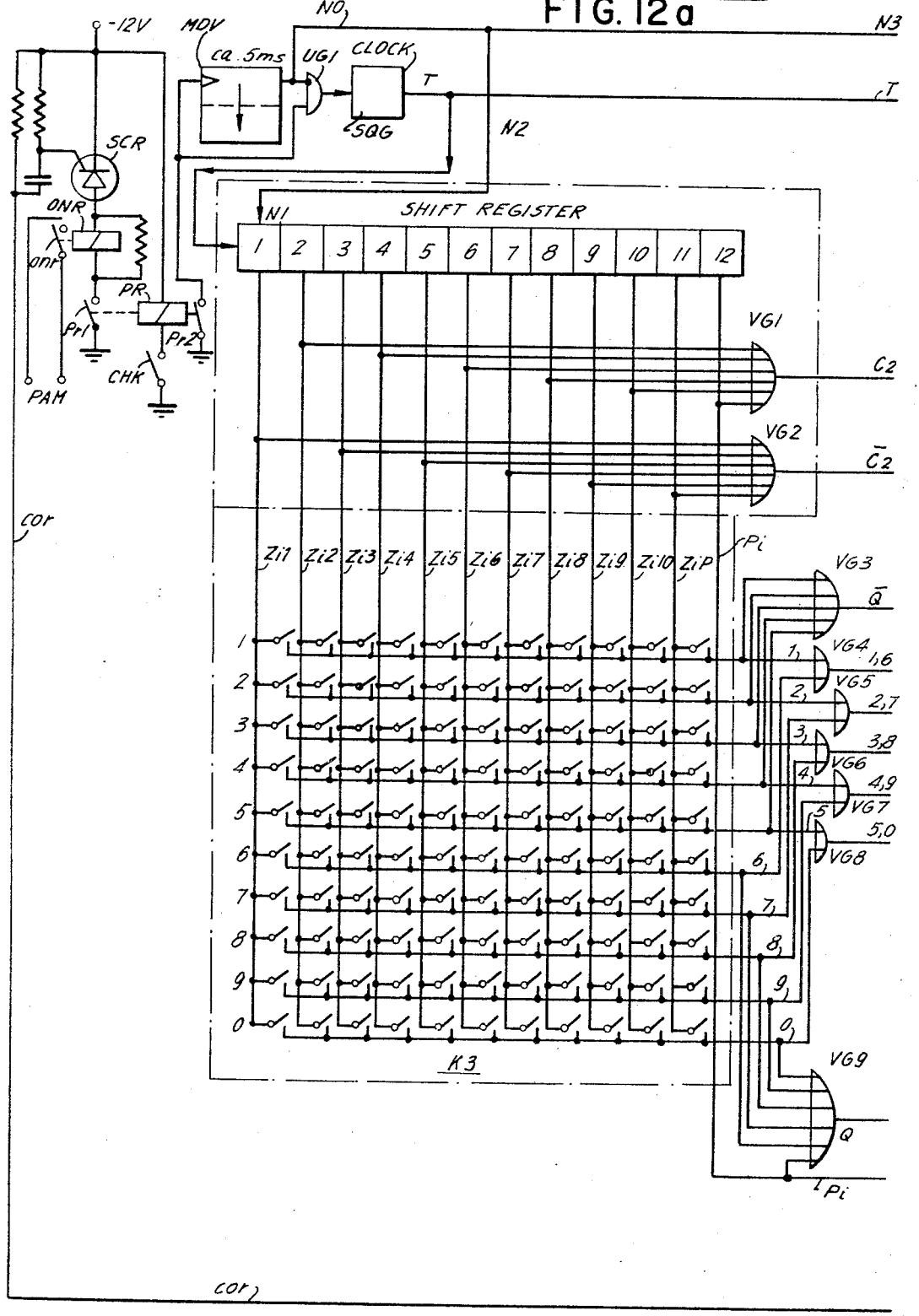
FIG. 12 (divided into FIGS. 12a and 12b) is a circuit diagram of a system corresponding essentially to FIG. 2 but modified for simultaneous parallel entry of digits.
Figure 12B:
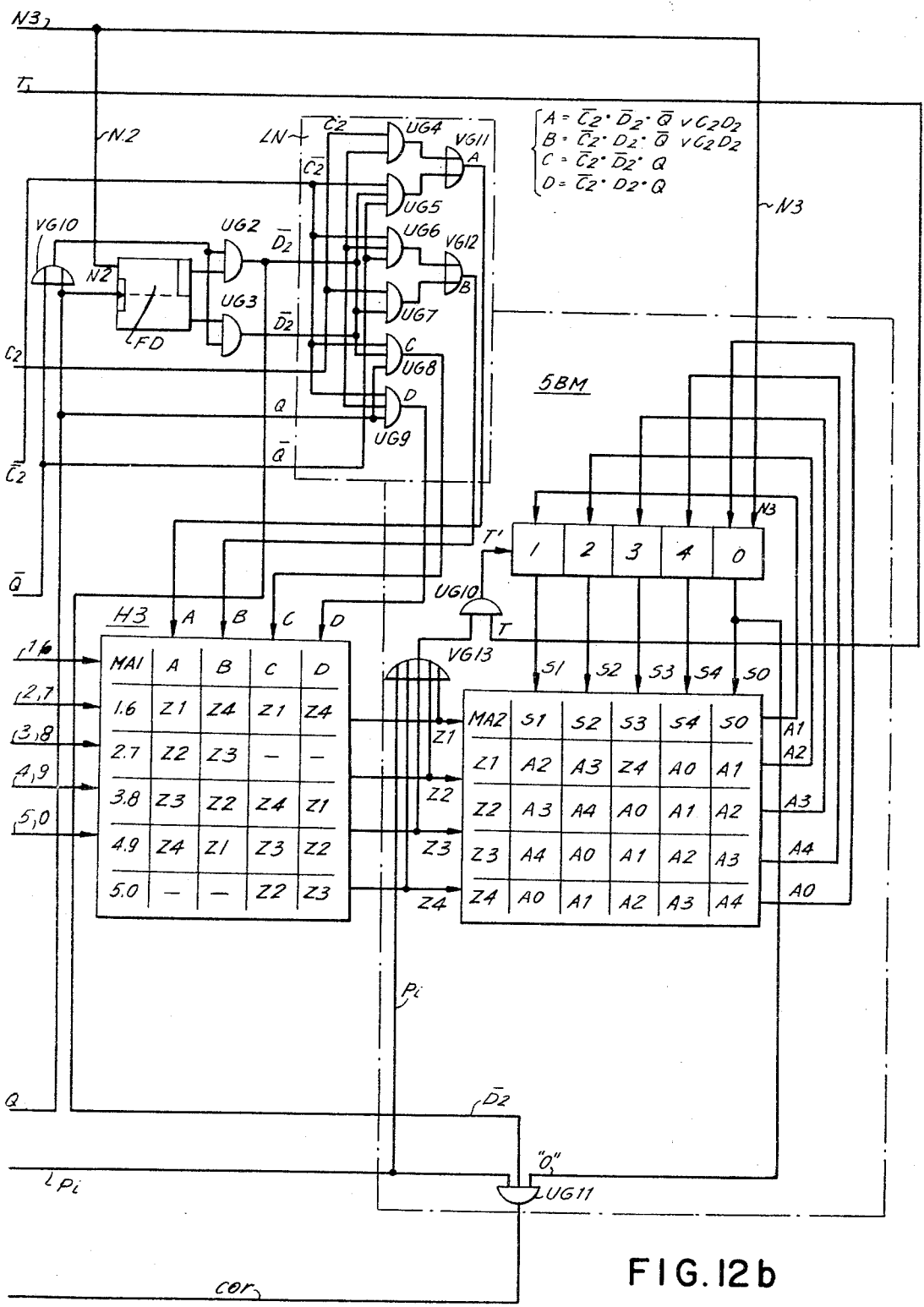
Figure 13A:
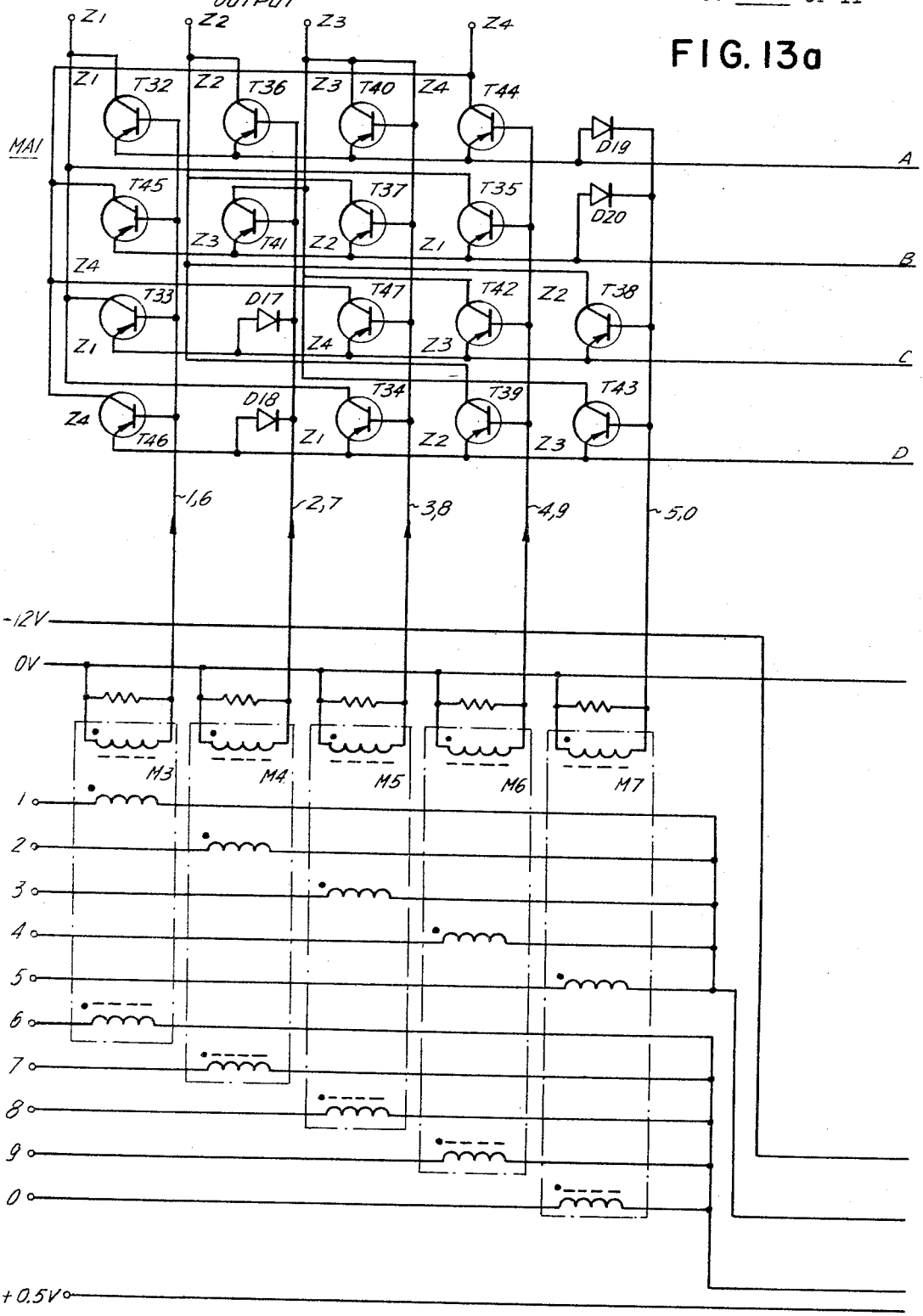
FIG. 13 (divided into FIGS. 13a and 13b) shows circuit details of FIG. 12.
Figure 13B:
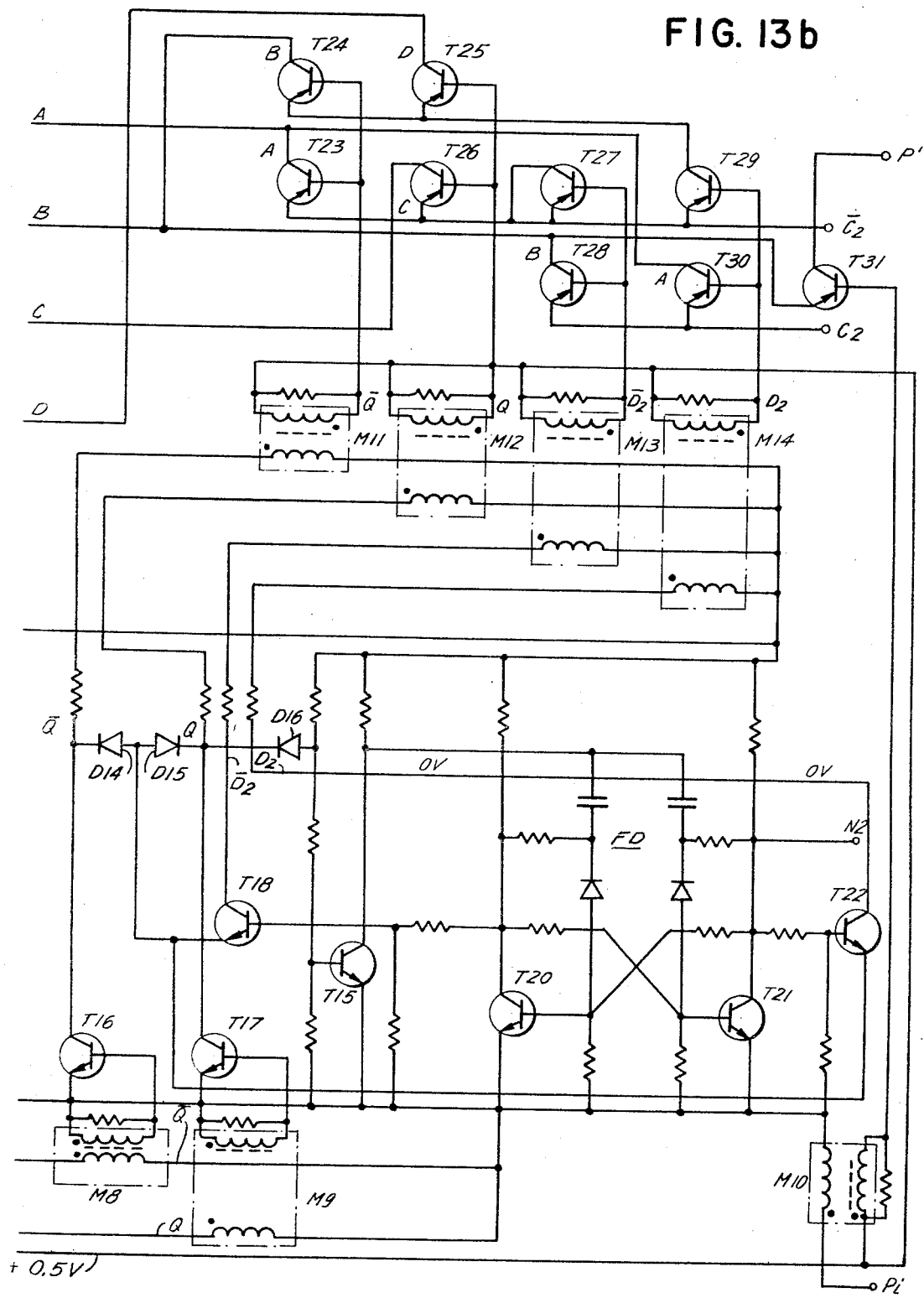
Figure 14:
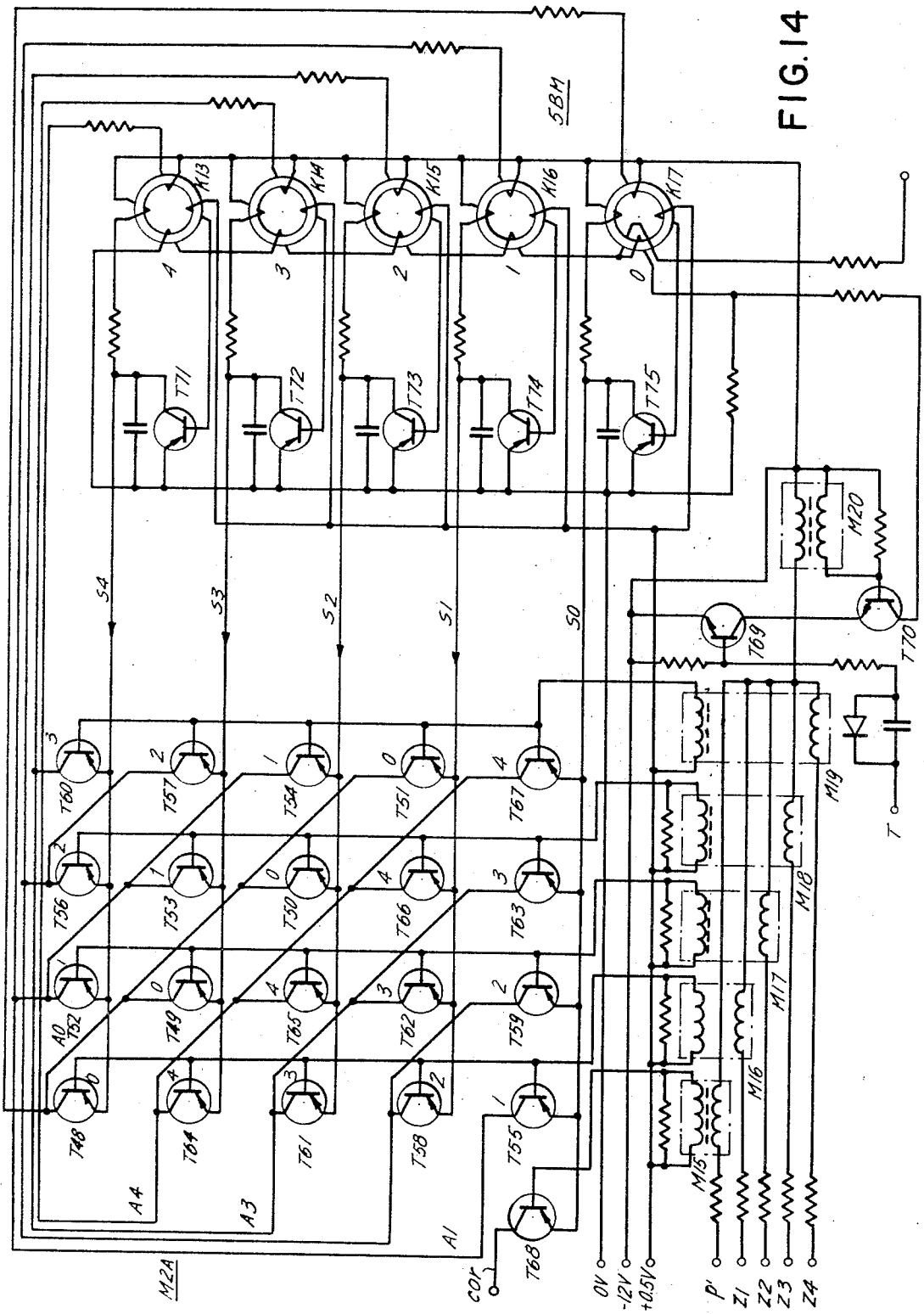
FIG. 14 shows further circuit details of FIG. 12.

The matrix of Table 10 is incorporated in the code converter H3 of the system shown in FIGS. 12 to 14, described presently. As regards the pulse sequences occurring in the system, reference may be had to FIG. 15.

In FIG. 12, the matrix MA1 is schematically represented in the same manner as Table 10, whereas FIG. 13 shows its electrical replica in detail. The performance of this matrix in conjunction with the other components of the same system will be apparent from the following description with reference to FIG. 12.

The accounting machine to be controlled by the self-checking system comprises a keyboard K3 with ten push-button contacts per digit position of the decimal number to be checked. In the present embodiments the keyboard capacity is for a number of ten digit positions. In addition, the keyboard has a vertical row $ZiP$ of push-button contacts for posting a check numeral. When no number is posted, "0" contacts (bottom row) of the 11 columns $Zi1$ to $Zi10$ and $ZiP$ are closed as shown. When a numeral is posted into any one digit position, the one contact corresponding to the posted digit value closes.

After the entire number, including the check digit, is posted, the attending person must depress a test key CHK which forms part of the device M1 corresponding to the equally designated device in FIG. 1. When the posted number is correct, the closing of key CHK has the result that a relay ONR in device M1 is energized and closes a contact $onr$ which completes a circuit between plugs PAM and thereby releases the machine control so that the accounting machine will commence operating. If the posted number is incorrect, the contact $onr$ does not close and the accounting machine will not start.

The just-mentioned discriminating performance of the ONR relay depends upon the result of the computation effected within the checking system. This computation takes place as follows.

The closing of the test key CHK energizes a relay PR whose contact $pr1$ prepares the relay ONR for operation by connecting it to ground (zero voltage). A second contact $pr2$ connects zero voltage to a monostable multivibrator MOV and simultaneously to an inhibit gate UG1. The multivibrator MOV supplies a pulse of about 5 milliseconds duration. During the pulse, the gate UG1 is blocked to prevent faults due to contact bouncing. Within the interval of 5 milliseconds, the pulse from the multivibrator MOV is supplied through the lead NO to other system components with the following effects:

(1) In a shift register SHR the pulse, entering through lead N1, sets the first core 1 or other register unit.

(2) A flip-flop FD receives the pulse through lead N2 and is thereby reset to the 0-state.

(3) In a 5-bit memory 5BM, the pulse, supplied through lead N3, sets the 0-core and resets the cores 1–4 to the 0-states.

After termination of the 5 milliseconds pulse from MOV, the inhibit gate UG1 opens so that a square-wave generator SQG is switched on to furnish a frequency of approximately 100 kilocycles per second. The synchronizing or clock pulse from SQG is supplied through synchronizing leads T to the shift register SHR and an AND-gate UG10. Each clock pulse shifts the set condition of the first core one position forward in the shift register SHR. Thus, the leads $Zi1$ to $Zi10$, $ZiP$ and P sequentially receive one current pulse each.

Depending upon which particluar contact is closed in the respective digital columns, the pulse is issued to ten output leads of the keyboard K3. The five output leads corresponding to the respective digit values 1 and 6 are connected to the respective two inputs of an AND-gate VG4. In the same manner, the output leads 2 and 7, 3 and 8, 4 and 9, 5 and 0 are connected in pairs to the respective inputs of AND-gates VG5 to VG8. Thus, only five output leads from the respective AND-gates VG4 to VG8 reach the above-mentioned matrix MA1 where they become interlinked with the separately supplied auxiliary variables A, B, C, D in accordance with the truth table shown at MA1 in FIG. 12 corresponding to Table 10.

For producing the auxiliary variables A, B, C, D, the command $C_2$ is derived from the even digit positions of the number posted into K3, and the command $\overline{C}_2$ from the odd digit positions of the number. The digit values from 1 to 5 result in the command $\overline{Q}$, and the digit values of 6 to 0 result in the command Q, as has been explained in the foregoing.

The command Q is accordingly taken from an AND-gate VG9 whose respective inputs are connected with the five output leads of the keyboard K3 that corresponds to the digit values 6 to 0, and the output of gate VG9 furnishes the command pulse Q to the flip-flop FD. The end flank of the pulse Q switches the flip-flop FD each time to the other state; that is, in the flip-flop FD the binary components of the posted number are added in modulus 2.

Analogously, the command pulse $\overline{Q}$ appears as the output of an AND-gate VG3 which has five inputs connected with those respective output leads of keyboard K3 that correspond to the digit values 1 to 5. The outputs of gates VG3 and VG9 are connected with the respective input of an AND-gate VG10. The output of the gate VG10 is connected to respective inputs of two AND-gates UG2 and UG3 whose other inputs are connected with the respective outputs of the flip-flop FD. The AND-gates UG2 and UG3 furnish the commands $\overline{D}_2$ and $D_2$ respectively. Depending upon the state of the flip-flop FD, the command pulses Q or $\overline{Q}$ result in issuing the respective commands $D_2$ and $\overline{D}_2$.

A logic network LN composed of AND-gates UG4 to UG9, VG11 and VG12 serve to compute the auxiliary variables A, B, C, D from the commands $C_2$, $\overline{C}_2$, $D_2$ $\overline{D}_2$, Q, $\overline{Q}$ in accordance with the above-presented equations. This logic network LN and the matrix MA1 jointly constitute a code converter corresponding in principle to the code converter H2 in FIG. 2.

The check value pulses appearing on the four output leads Z1 to Z4 of the matrix MA1 are supplied to the matrix MA2 which interlinks the check values with the memory values S2 to S0 in accordance with the truth table shown at MA2 in FIG. 12. The interlinking is such as to result in a modulo-5 addition of the check values. This comes about as follows.

The 5-bit memory 5BM in FIG. 12 is not a ring-shift register or ring counter. The modulo-5 addition rather comes about by the coaction of the memory 5BM with the matrix MA2 so that both conjointly compare with the quinary counter A2 in FIG. 2.

At the beginning the memory 5BM is in state "0." When a check-value pulse appears on one of the input leads Z1 to Z4 of matrix MA2, the same pulse passes through an AND-gate VG13 to one of the inputs of the AND-gate UG10, so that the gate UG10 is opened during the clock-pulse interval. As a result, the clock pulse appears on lead T', and the memory 5BM is read out. Simultaneously, another memory core is set in accordance with the results supplied to the memory through the matrix output leads A1 to A0. This is possible because the core being read out is never set at the same time, as this would correspond to the addition of the check value 0, which is not used, as will be seen from Table 10 of matrix MA1.

After the individual digits and the check digit have been added in the 5-bit memory 5BM, the AND-gate UG10 is opened for the duration of a clock pulse supplied on line T, due to the pulse received by the gate UG10 from the shift register SHR through line Pi and gate VG15. As a result, the content of memory 5BM is read out. Only when the pulse thus read out of the memory appears on the line S0 and simultaneously the flip-flop FD is in condition to open the gate UGT, can the AND-gate UG11 issue the pulse to the "correct" line cor. This pulse fires a thyristor SCR (such as a silicon controlled rectifier) which then completes the circuit for the relay ONR so that the latter becomes energized between zero potential, applied by means of the then closed contact pr1, and a plug connected to minus 12 volt, for example. The relay ONR in device M1 thus operates to permit starting of the the accounting machine, After starting of the machine, the contact of key CHK is opened so that the relay PR drops off and interrupts the holding circuit for the relay ONR.

Details of the matrix MA1 and of the AND-gate network LN are illustrated in FIG. 13. The components shown in FIG. 13 are combined to a single unit which has all of its input lines, such as N2 and Pi, as well as all output lines, such as Z1 to Z4, terminate into respective plugs for removably coupling the entire unit with the electrical components of the accounting machine and its keyboard K3 on the one hand, and with the matrix MA2 and the memory 5BM on the other hand.

As shown in FIG. 13, the matrix MA1 is a network of OR-gates and is composed of interwired transistors T32–T43 and diodes D17–D20. The digit-value leads (plugs) 1 to 0 coming from the keyboard K3 are connected to pulse transformers M3 to M7 whose respective secondary windings apply negative voltages to the bases of the respective matrix transistors T32–T43. The command pulses Q and $\bar{Q}$ are produced with the aid of further pulse transformers M11 to M14. The command Q is inverted by a transistor T15 and serves to switch the flip-flop FD (FIG. 12) which, according to FIG. 13, comprises two transistors T20 and T21. The commands Q or $\bar{Q}$ pass through diodes D14 and D15 to the emitters of respective transistors T18 and T22 which are then switched onto the respective leads $D_2$ and $\bar{D}_2$, depending upon the state of the flip-flop FD. Further transistors T24–T30 connected to the pulse transformers M11 to M14 form part of the logic network for generating the auxiliary variables A, B, C and D in accordance with the equations already mentioned.

When a pulse appears on the line (plug) Pi connected with the line Pi shown in FIG. 12, it acts through the pulse transformer M10 and opens the transistor T31 if its emitter is then at zero potential, which is the case when the leads $C_2$ and $\bar{D}_2$ carry a pulse simultaneously with the occurrence of the pulse on line Pi, thus satisfying the co-incidence conditions.

The output leads (plugs) Z1 to Z4 (FIGS. 13, 14) pass the additional check-value pulses to the matrix MA2 of which an embodiment of circuit details is shown in FIG. 14.

The 5-bit memory 5BM in this embodiment corresponds to a shift register and is shown to be of the transistor-controlled magnet core type. At the start of the computation to be performed by the system, the magnet core 0 designated by K17 in FIG. 14 was set through the input line (plug) N3 (FIG. 14), and the cores 1–4 were reset to zero, as explained above with reference to FIG. 12. When an additional check value pulse appears, the transistor T70 is turned on through the pulse transformer M20. The clock pulse can then pass through transistors T69 and T70 to the winding of the memory being read out. Hence, the core 0 (K17) is read out, whereby the transistor T75 is turned on. This places zero potential onto the emitters of the transistors T55, T59, T63, T67. Depending upon which of the pulse transformers M16 to M19 is excited by the corresponding check value pulse occurring simultaneously with the clock pulse, this one transistor is turned on. The pulse current from transistor T75 thus passes through the selected one matrix transistor to the corresponding one of the four result lines A1 to A4 with the effect that a different core, corresponding to the result, is then set in the memory 5BM. If no check-value pulse is present, the pulse transformer M20 is not excited, and the content of the memory 5BM remains unchanged. The command pulse on line Pi, already arrived through the AND-network of transistors T28 and T31 (FIG. 13), also excites the pulse transformer M20 (FIG. 14), so that the memory 5BM is read out. Simultaneously a negative voltage is applied through the pulse transformer M15 to the base of transistor T68. If during the above-described checking operation (that is, when the test key CHK according to FIG. 12 is actuated after posting the entire number including the check numeral) and core 0 (K17) in memory 5BM was set, there occurs the AND-coincidence in transistor T68 so that a pulse passes onto the test line cor. This pulse, as described, fires the thyristor SCR (FIG. 12) which causes the relay ONR to respond and to start the operation of the accounting machine.

Figure 15:
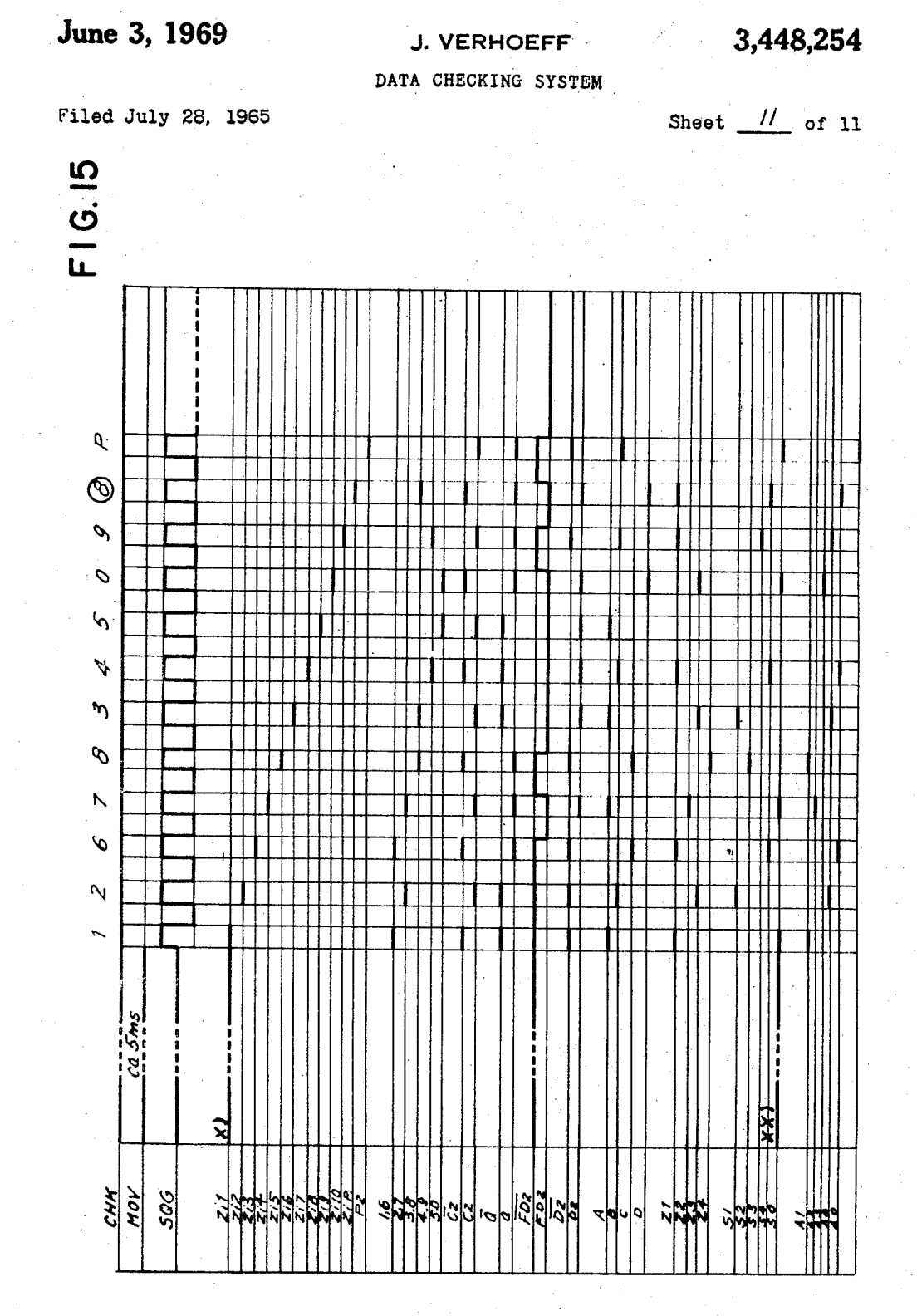

The above-described computation performance of the system is exemplified by the pulse-time diagrams presented in FIG. 15 with reference to the numeral

1267834509 posted into the keyboard of the accounting machine together with the check numeral 8. The heavy horizontal dashes in FIG. 15 indicate that a current pulse passes through the identified components during the stated intervals of time.

While in the embodiments described above, the values assigned to the numerals 1 . . . 0 are analogously 1 . . . 10, it will be obvious that other values, i.e., pulse numbers, may be assigned internally of the logic system to the respective input numerals. The assignment of values can be so chosen, that the addition of "0" in front of an entered number will not change the check numeral or the result of the checking operation. For example, in the system of FIGS. 12 to 14, the values 5 and 10 can thus be assigned to the input characters "0" and "5" respectively, and the check numeral may form the first instead of the last digit of the complete number entered.

As explained, and as will be obvious upon a study of this disclosure to those skilled in the art, my invention permits of a great variety of modifications and applications for various purposes, and hence can be given embodiments other than particularly illustrated and described herein, without departing from the essential features of my invention and within the scope of the claims annexed hereto.

I claim:

1. Apparatus for checking a digital group of characters selected from a total of $4m+2$ different characters, comprising means for entering the group of characters, modulo-2 logic means connected to said entering means for determining the relation $c/d$ wherein $c$ is the modulo-2 sum of the number of entered digit positions independent of the value of said digit positions and $d$ is indicative of the modulo-2 sum of the number of entered digit positions whose number value is at least $2m+2$, modulo-$(2m+2)$ algebraic adding means connected to said entering means for response to all digit values of the entered characters, said modulo-2 logic means being in controlling connection with said adding means for controlling its algebraic sense in dependence upon a given condition of said $c/d$ relation whereby upon entering of said character group the result of said algebraic addition and the $c/d$ relation then reached are conjointly indicative of a singular check symbol from among said $4m+2$ characters, which check symbol, when digitally added to the entered group, causes the result of said algebraic addition and said $c/d$ relation to be in accordance with a predetermined checking condition.

2. Checking apparatus according to claim 1, comprising an indicator matrix device connected to and controlled by said modulo-$(2m+2)$ algebraic adding means and said modulo-2 logic means for indicating said check symbol upon entering of said group of characters.

3. Apparatus for checking a digital group of characters selected from a total of $4m+2$ different characters, comprising means for entering the group of characters inclusive of a check symbol selected from said same $4m+2$ characters and forming a digit of said group, modulo-2 logic means connected to said entering means for determining the relation $c/d$ wherein $c$ is the modulo-2 sum of the number of entered digit positions independent of the value of said digit positions and $d$ is indicative of the modulo-2- sum of the number of entered digit whose number value is at least $2m+2$, modulo-$(2m+2)$ algebraic adding means connected to said entering means for response to all digit values of the entered characters, said modulo-2 logic means being in controlling connection with said adding means for controlling its algebraic sense in dependence upon a given condition of said $c/d$ relation, the selection of said check symbol being such that, when the group is correctly entered, the result of said algebraic addition and the $c/d$ relation reached upon entering of the group are in coincidence with a predetermined checking condition, and output means connected to said logic means and said adding means to be controlled in dependence upon occurrence of said coincidence condition.

4. Checking apparatus according to claim 3, said output means comprising a two-state device indicative of whether or not the entered group inclusive of the check symbol is correct.

5. Apparatus for checking a decimal number, comprising entering means for entering the digit numerals of the number inclusive of a selected decimal check numeral forming a digit of said number, binary logic circuit means connected to said entering means for forming the $c/d$ relation of the modulo-2 counted digit positions (c) of the entered number to the modulo-2 counted digit values above five $(d)$, quinary algebraic adding means connected to said entering means for response to all digit values of the entered number, said binary logic circuit means being in controlling connection with said adding means for controlling its algebraic sense in dependence upon a given condition of said $c/d$ relation, the selection of said check numeral being such that, when the entered number is correct, the result of the algebraic addition and the $c/d$ relation reached upon entering of the number are in coincidence with a predetermined checking condition, and output means connected to said logic means and said adding means to be controlled in dependence upon occurrence of said coincidence condition.

6. Apparatus for checking a digital group of characters selected from a total of $4m+2$ different characters, $m$ being an integer, comprising means for entering the group of characters, electric pulse sequence means connected with said entering means for converting the entered characters into voltage pulses corresponding in number to respective digit values of said different characters, logic circuit means connected to said pulse means and comprising a first binary counter for modulo-2 counting of the digit positions and a second binary counter for modulo-2 counting of the digit values above $2m+2$, modulo-$(2m+2)$ algebraic adding means having an adding input connected to said pulse sequence means for algebraic modulo-$(2m+2)$ addition of said pulses and having a control input connected to said two binary counters for controlling the algebraic addition in one and the other sense depending upon the counts of said first and second binary counters being equal and unequal respectively, whereby upon entering of said character group the result of the algebraic addition and the count then reached by at least said second counter are conjointly indicative of a singular check symbol from among said $4m+2$ characters, which check symbol, when digitally added to the entered group, causes the result of said algebraic addition and said $c/d$ relation to be in accordance with a predetermined checking condition.

7. Apparatus for checking a digital group of characters selected from a total of $4m+2$ different characters, $m$ being an integer, comprising means for entering the group of characters inclusive of a check symbol selected from said same $4m+2$ characters and forming a digit of said group, electric pulse means connected with said entering means for issuing voltage pulses equal in number to respective digit values of said different characters, logic circuit means connected to said pulse means and comprising a first binary counter for modulo-2 counting of the digit positions and a second binary counter for modulo-2 counting of the digit values above $2m+2$, modulo-$(2m+2)$ algebraic adding means having an adding input connected to said pulse sequence means for algebraic modulo-$(2m+2)$ addition of said pulses and having a control input connected to said two binary counters for controlling the algebraic addition in one and the other sense depending upon the counts of said first and second binary counters being equal and unequal respectively, the selection of said check symbol being such that, when the group is correctly entered, the result of said algebraic addition and the count of at least said second counter are in coincidence with a predetermined checking condition, and output means connected to said logic circuit means and said adding means to be controlled in dependence upon occurrence of said coincidence condition.

8. In checking apparatus according to claim 7, said group of characters being a decimal number so that $m=2$, the numerals 1 to 9 having respective digit values of 1 to 9, and numeral 0 having the digit value 10.

9. Apparatus for checking a digital group of characters selected from a total of $4m+2$ different characters wherein $m$ is an integer and each character has a fixed value, the group including an added digital check symbol selected from said same $4m+2$ characters, comprising means for modulo-2 addition of binary components of said character values, means for modulo-$(2m+1)$ algebraic addition of the difference of sequential pairs of $(2m+1)$-ary components of said values, means for controlling the algebraic sense of the difference between the $2j$-th and the $(2j+1)$-th of the $(2m+1)$-ary components in dependence upon $-1$ in the exponent, equal to the sum of the binary components of the first $2j$ characters, and upon a function of said binary components which does not or does change the result of the modulo-$(2m+1)$ addition in the event an exchange occurs between two characters having the same or different binary components respectively.

10. Checking apparatus according to claim 9, wherein said function of said binary components is formed of the algebraic sum of the doubled binary components of the digital value corresponding to each $2j$-th character, said algebraic sum having a ($+$ or $-$) sign opposed to that of said difference between the $2j$-th and $(2j+1)$-th of the $(2m+1)$-ary components.

11. Apparatus for checking a decimal number by adding thereto a check digit selected from the decimal numerals 1 . . . 0, comprising input means for sequentially entering the respective digit numerals of the decimal number, said input means having electric pulse means for issuing sequences of pulses corresponding in number to different values assigned to said respective numerals, a time delay member responsive to each occurrence of said respective pulse sequences, a first cyclical modulo-2 counter having an input connected through said member to said pulse means for counting the number of pulse sequences, a six-bit register having a set input connected to said pulse means to reach its end stage upon receiving more than five pulses from said pulse means and having a reset input connected to said delay member so as to be reset upon termination of each pulse sequence, a coincidence gate network having inputs connected to the outputs of said first counter and of said register and of said delay member respectively, a second modulo-2 counter having an input connected to the output of said gate network for modulo-2 counting of pulse sequences having more than five pulses, a summing-point device having two inputs connected to the respective outputs of said two binary counters and having an output to furnish a control signal indicative of the mutual relation of the respective counter states, a reversible and cyclical modulo-5 counter having a counting input connected to said pulse means for algebraic modulo-5 addition of the issued pulses, said modulo-5 counter having a control input connected to said summing-point device output for controlling the sense of the algebraic addition in dependence upon said relation.

12. Checking apparatus according to claim 11, comprising an indicator device connected to and controlled by said modulo-5 counter and said second modulo-2 counter for indicating the check numeral upon entering of the chemical number.

13. Checking apparatus according to claim 11, comprising an indicator device connected to said three counters to be jointly controlled thereby for indicating whether or not the decimal number inclusive of the check numeral is correct.

14. Apparatus for checking a decimal number by adding thereto a check digit selected from the decimal numerals 1 . . . 0, comprising input means for entering the digit numerals of the decimal number, said input means having electric pulse means and having separate pulse leads assigned to different digit values respectively, first logic circuit means connected to said leads for modulo-2 addition of the digit positions, second logic circuit means connected to said leads for modulo-2 addition of digit values above 5, a code converter having matrix inputs connected with said respective leads and having further inputs connected to the respective outputs of said first and second logic circuit means, said code converter having four matrix outputs, a modulo-5 algebraic adding device having a counting input connected to said leads for response to all of said pulses and having four further inputs connected with said four matrix outputs respectively for suppression of counter states determined by said converter, whereby the result of the modulo-5 addition conjointly with the state reached by said second counter is indicative of accuracy or inaccuracy of the entered number inclusive of the check digit.

References Cited

UNITED STATES PATENTS

| | | | |
|---|---|---|---|
| 2,684,201 | 7/1954 | Starreveld et al. | 340—146.1 X |
| 2,776,091 | 1/1957 | Chenus | 340—146.1 X |
| 2,886,240 | 5/1959 | Linsman | 235—153 |
| 2,919,854 | 1/1960 | Singman | 235—153 |
| 3,138,701 | 6/1964 | Davis | 235—153 |

MALCOLM A. MORRISON, *Primary Examiner.*

CHARLES E. ATKINSON, *Assistant Examiner.*

U.S. Cl. X.R.

235—61.7; 340—146.1